United States Patent [19]
Collins et al.

[11] Patent Number: 5,623,404
[45] Date of Patent: Apr. 22, 1997

[54] SYSTEM AND METHOD FOR PRODUCING SCHEDULES OF RESOURCE REQUESTS HAVING UNCERTAIN DURATIONS

[75] Inventors: John E. Collins, Hudson, Wis.; Elizabeth M. Sisley, Woodbury, Minn.

[73] Assignee: Minnesota Mining and Manufacturing Company, St. Paul, Minn.

[21] Appl. No.: 210,678

[22] Filed: Mar. 18, 1994

[51] Int. Cl.⁶ .................................................. G06F 17/60
[52] U.S. Cl. .................................................. 395/209
[58] Field of Search ................................ 364/401, 402, 364/403, 468

[56] References Cited

U.S. PATENT DOCUMENTS

| | | |
|---|---|---|
| 4,092,718 | 5/1978 | Wendt. |
| 4,212,069 | 7/1980 | Baumann. |
| 4,799,162 | 1/1989 | Shinkawa et al.. |
| 4,937,743 | 6/1990 | Rassman et al. ............... 364/401 |
| 5,009,431 | 4/1991 | Natarajan ....................... 364/468 |
| 5,093,794 | 3/1992 | Howie et al. ................... 364/468 |
| 5,111,391 | 5/1992 | Fields et al. ................... 364/401 |
| 5,122,959 | 6/1992 | Nathanson et al.. |
| 5,148,365 | 9/1992 | Dembo ............................ 364/402 |
| 5,241,465 | 8/1993 | Oba et al. ....................... 364/401 |
| 5,325,292 | 6/1994 | Crockett ......................... 364/401 |
| 5,406,476 | 4/1995 | Deziel, Jr. et al. ............. 364/402 |

OTHER PUBLICATIONS

A. V. Hill and D. C. Whybark, "Chexpedite: A Computer-Based Approach to the Bank Courier Problem," *Decision Sciences*, vol. 13, No. 2, Apr. 1982, pp. 251–265.

M. S. Fox and S. F. Smith, "ISIS—a knowledge-based system for factory scheduling," *Expert Systems*, vol. 1, No. 1, 1984, pp. 25–49.

A. V. Hill and D. C. Whybark, "Comparing Exact Solution Procedures for the Multi-Vehicle Routing Problem," *The Logistics and Transportation Review*, vol. 12, No. 3, 1976, pp. 145–153.

T. Dean and M. Boddy, "An Analysis of Time-Dependent Planning," in Proceedings of the Seventh National Conference on Artificial Intelligence, A.A.A.I., 1988, pp 49–54.

H. Berliner and G. Goetsch, "A Study of Search Methods: The Effect of Constraint Satisfaction and Adventurousness," in Proceedings of the Ninth International Joint Conference on Artificial Intelligence, vol. 2, Aug. 18–23, 1985, pp. 1079–1082.

A. V. Hill, J. D. Naumann, and N. L. Chervany, "SCAT and SPAT:" Large-Scale Computer-Based Optimization Systems for the Personnel Assignment Problem, *Decision Sciences*, vol. 14, No. 2, Apr. 1983, pp. 207–220.

B. Kalantari, A. V. Hill, and S. R. Arora, "An algorithm for the traveling salesman problem with pickup and delivery customers," *European Journal of Operational Reserach*, vol. 22, No. 3, Dec. 1985, pp. 377–386.

(List continued on next page.)

*Primary Examiner*—Robert A. Weinhardt
*Attorney, Agent, or Firm*—Carolyn A. Bates; Steven J. Shumaker

[57] ABSTRACT

A system and method for scheduling resource requests for a resource provider generate a first schedule, based on expected durations of each resource request, and a second schedule, based on longer, pessimistic durations of each resource request. A user interface simultaneously displays the first and second schedules to a system user. The first schedule provides the system user with a guide to good overall management of the resource performance. The second schedule provides the system user with a guide for making time commitments to customers with a greater degree of confidence. The system and method employ a variety of techniques including statistic probability calculations to determine expected and pessimistic durations for each resource request, and incorporate features for updating the first and second schedules in response to dynamic changes in the resource environment.

32 Claims, 12 Drawing Sheets

OTHER PUBLICATIONS

A. V. Hill, "An Experimental Comparison of Dispatching Rules for Field Service Support," *Decision Sciences*, vol. 23, No. 1, Winter 1992, pp. 235–249.

D. Whitley, T. Starkweather, and D. Shaner, "The Traveling Salesman and Sequence Scheduling: Quality Solutions Using Genetic Edge Recombination," *Handbook of Genetic Algorithms*, Chapter 22, 1991, pp.350–372.

M. Zweben, M. Deale, and R. Gargan, "Anytime Rescheduling," in Proceedings of a Workshop on Innovative Approaches to Planning, Scheduling and Control, San Diego, California, Nov. 5–8, 1990, pp. 251–259.

A. V. Hill, V. A. Mabert, and D. W. Montgomery, "A Decision Support System for the Courier Vehicle Scheduling Problem," *OMEGA Int. J. of Mgmt Sci.*, vol. 16, No. 4, 1988, pp. 333–345.

H. Prade, "Using Fuzzy Set Theory in a Scheduling Problem: A Case Study," *Fuzzy Sets and Systems*, vol. 2, No. 2, 1979, pp. 153–165.

M. Zweben, "Constraint–Based Simulated Annealing: An Iterative Improvement Framework for Constraint Satisfaction Search," NASA Ames Research Center, Moffett Field, California, Aug. 9, 1990, pp. 1–13.

M. S. Fox, N. Sadeh, and C. Baykan, "Constrained Heuristic Search," in Proceedings of the Eleventh International Joint Conference on Artificial Intelligence (IJCAI), Detroit, Michigan, vol. 1, Aug. 20–25, 1989, pp. 309–315.

W. Chiang and M. S. Fox, "Protection Against Uncertainty in a Deterministic Schedule," in Proceedings of the Fourth International Conference on Expert Systems in Production and Operations Management, Hilton Head, South Carolina, May 1990, pp 184–196.

R. Hublou, "Manufacturing Operations Scheduling," *Business Intelligence Program Report D90–1436*, SRI International, May 1990, pp. 1–39.

A. V. Hill, "An Experimental Comparison of Human Schedulers and Heuristic Algorithms for the Traveling Salesman Problem," *Journal of Operations Management*, vol. 2, No. 4, Aug. 1982, pp. 215–223.

P. Prosser, "A Reactive Scheduling Agent" in Proceedings of the Eleventh International Joint Conference on Artificial Intelligence, Detroit, Michigan, Aug. 20–25, 1989, pp. 1004–1009.

E. Ghalichi and J. Collins, "The Dispatch Advisor," in Proceedings of the Workshop on Artificial Intelligence for Customer Service and Support, Eighth IEEE Conference on Artificial Intelligence Applications, Monterey, California, Mar. 3, 1992, pp. 60–68.

J. E. Collins and E. M. Sisley, "AI in Field Service: The Dispatch Advisor," in Working Notes, AI in Service and Support: Bridging the Gap Between Research and Applications, Eleventh National Conference on Artificial Intelligence, Washington, D.C., Jul. 11–15, 1993, pp. 26–37.

J. Tsitsiklis, "Special Cases of Traveling Salesman and Repairman Problems with Time Windows," Report LIDS–P–1987, Massachusetts Institute of Technology, Jun. 1990, pp 1–23.

S. F. Smith, "The OPIS Framework for Modeling Manufacturing Systems," Tech Report CMU–RI–TR–89–30,Carnegie–Mellon University, Dec. 1989, pp. 1–56.

D. L. Haugen, "A Study of Scheduling and Quality of Field–Service Support Systems," Ph.D. Thesis, University of Minnesota, Nov. 1993, pp. 1–251.

Mitchell et al., "The Determination of Realistic Probability Levels for Project Completion Dates", *The Aeronautical Journal of the Royal Aeronautical Society*, vol. LXXVII, Jan.–Dec. 1973, Technical Notes XP 00566662, pp. 620–625.

Williams, T. M., "Practical Use of Distributions in Network Analysis",*Journal of the Operational Research Society*, vol. 43, No. 3, 1992, pp 265–270.

Kamburowski, Jerzy, "Normally Distributed Activity Durations in PERT Networks,", *Journal of the Operational Research Society*, vol. 36, No. 7, Jul. 1985, pp. 1051–1057.

Nkasu, Michael M., "Stochastic Resources Modelling," *IEEE*, Oct. 27, 1991, pp. 342–347.

SYSTEM AND METHOD FOR PRODUCING SCHEDULES OF RESOURCE REQUESTS HAVING UNCERTAIN DURATIONS

FIELD OF THE INVENTION

The present invention relates to resource management, and, more particularly, to techniques for scheduling resource requests assigned to a resource provider.

DISCUSSION OF RELATED ART

Resource scheduling problems are a concern in many organizations in which a plurality of resource requests are assigned to an individual resource provider. If the individual resource provider cannot handle all resource requests simultaneously, a schedule must be generated. The schedule must define a time-ordered sequence of the resource requests assigned to the individual resource provider, and specify particular times at which the resource provider is to serve each resource request. Techniques for generating a schedule consider time-related factors such as the priorities and durations of the resource requests, and transition times between consecutively scheduled resource requests.

The durations of the resource requests, in particular, greatly affect the efficient scheduling of future resource requests, as well as the ability to make time commitments to the entities requesting resources. The duration of a resource request refers to the amount of time that a resource provider requires to serve the request, and a time commitment refers to a promised time at which the resource provider is to start to serve the request. In a complete schedule, the resource requests are each assigned start and completion times based on the expected durations of preceding resource requests and transition times. However, the durations of resource requests inevitably vary with the type of resources requested, and even vary for resource requests involving the same types of resources. Variation in the duration of a resource request will introduce variability into its completion time, and that variability will propagate to the start times of subsequent resource requests. This variation makes reliable scheduling very difficult.

Existing scheduling systems employ two basic approaches to the uncertainty problem. The first approach simply assumes a fixed duration for resource requests involving the same types of resources, based on past experience. This approach addresses the variation in the durations of resource requests involving different types of resources, but ignores the potential uncertainty in the durations of resource requests of the same type. Thus, confidence in the ability to make time commitments remains low. The second approach attempts to accommodate the uncertainty by incorporating a degree of slack into the schedule based on predicted maximums for the durations of particular types of resource requests. This margin of error enables more confident time commitments, but results in an inefficient use of the resource provider's time.

One example of the foregoing scheduling problem arises in the context of a field service environment. A field service environment exists in many organizations, characterized by a group of field service technicians dedicated to the repair and maintenance of a variety of industrial machines, office equipment, and the like. The field service technicians travel to a customer's location to perform routine maintenance of the customer's equipment and to provide repair services pursuant to customer service calls scheduled by a service call dispatcher. Thus, in the field service environment, the technicians act as resource providers, performing maintenance and repair services in response to resource requests in the form of routine maintenance appointments and customer service calls.

The duration of the service calls may vary according to the type of service involved. For example, a service call requesting a major repair may require much more time than a service call requesting routine maintenance. In addition, two service calls requesting the same type of repair may nevertheless vary in duration due to a combination of unforeseen factors such as, for example, misdiagnosis of the problem by the customer, the presence of additional necessary repairs noticed by the technician upon arrival, unexpected delay in access to the equipment at the customer's location, and even variations in the pace of the technician's work. If the service call dispatcher generates a schedule based on the assumption of fixed durations for certain types of service calls, the ability to make time commitments to customers clearly is impaired. Alternatively, if the service call dispatcher incorporates slack into the schedule by allotting a margin of uncertainty to each of the service calls, time commitments to customers can be made with a higher degree of confidence. However, the schedule will include a significant amount of unnecessary slack that causes increased idle time for the service technician and overly pessimistic commitments to customers, resulting in general inefficiency.

SUMMARY OF THE INVENTION

In view of the shortcomings of existing resource scheduling techniques, the present invention is directed to a system and method for scheduling resource requests having uncertain durations with increased reliability.

Additional features and advantages of the invention will be set forth in part in the description that follows, and in part will be apparent from the description, or may be learned by practice of the invention. The advantages of the invention will be realized and attained by the system and method particularly pointed out in the written description and claims hereof, as well as in the appended drawings.

To achieve the foregoing advantages, as broadly embodied and described herein, the present invention provides, in one aspect, a system and method for scheduling a plurality of resource requests for a resource provider, wherein each of the resource requests has an uncertain duration. To schedule the resource requests, the system and method determine first potential durations for the resource requests, determine second potential durations for the resource requests, generate a sequence of the resource requests, generate a first schedule of the resource requests by assigning a first start time to each of the resource requests following a first one of the resource requests in the sequence based on a sum of the first potential durations determined for the preceding resource requests in the sequence, and generate a second schedule of the resource requests by assigning a second start time to each of the resource requests following the first one of the resource requests in the sequence based on a sum of the second potential durations determined for the preceding resource requests in the sequence.

In another aspect, the present invention provides a system and method for scheduling a plurality of resource requests for a resource provider, wherein each of the resource requests has an uncertain duration, and each of the resource requests is associated with one of a plurality of different types of activities. To schedule the resource requests, the system and method match each of the resource requests with one of a plurality of probability distributions for a potential duration of the respective resource request based on the type of activity associated with the respective resource request, generate a sequence of the resource requests, generate a first combined probability distribution for each of the resource requests, the first combined probability distribution combining the probability distributions matched with each of the preceding resource requests in the sequence, select a probability level, compute, for each of the resource requests, a duration in the first combined probability distribution for the respective resource request based on the probability level, and generate a schedule of the resource requests by assigning a start time to each of the resource requests following the first one of the resource requests in the sequence based on the duration in the first combined probability distribution computed for the respective resource request.

It is to be understood that both the foregoing general description and the following detailed description are exemplary and explanatory only, and not restrictive of the invention, as claimed.

The accompanying drawings are included to provide a further understanding of the invention and are incorporated in and constitute a part of this specification. The drawings illustrate exemplary embodiments of the invention and together with the description serve to explain the principles of the invention.

DETAILED DESCRIPTION OF THE PREFERRED EMBODIMENTS

One skilled in the art, given the description herein, will recognize the utility of the system and method of the present invention in a variety of diverse resource environments in which scheduling problems exist. For example, it is conceivable that the system and method of the present invention may be adapted for assignment and scheduling problems existent in telecommunications systems, transportation dispatching organizations, and emergency services dispatching organizations. However, for ease of description, as well as for purposes of example, the present invention will be described in the context of a field service environment. The system and method of the present invention will also be described together herein, with the method contemplated as being implemented as a series of operations performed by the system.

Figure 1:
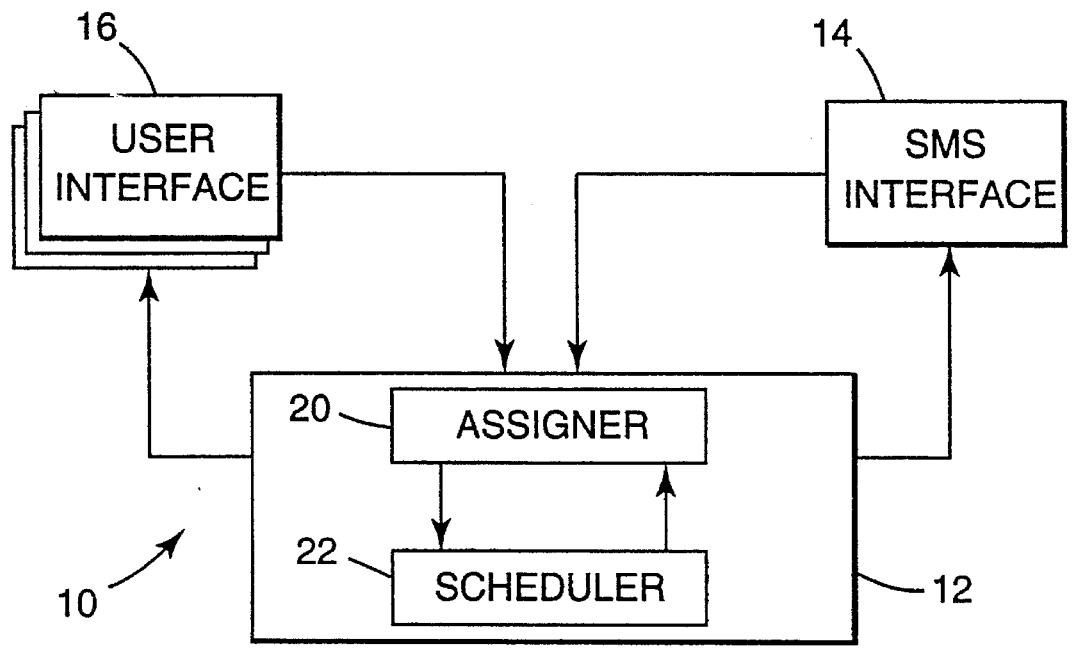
FIG. 1 is a block diagram of a computer-implemented software process structure incorporating a system and method for scheduling resource requests in accordance with the present invention.

FIG. 1 is a block diagram of a computer-implemented software process structure 10 configured for application in a field service environment. The software process structure 10 incorporates a system 12 for assigning and scheduling service calls, a service management system (SMS) interface 14, and at least one interactive user interface 16. The assigning and scheduling (A/S) system 12 is a software system realized, for example, by a software process running on a standard Unix™ workstation. The A/S system 12 combines optimization, artificial intelligence, and constraint-processing techniques to arrive at near-optimal assignment and scheduling solutions. The A/S system 12 is described in detail in U.S. Pat. No. 5,467,268, to Elizabeth M. Sisley and John E. Collins, the content of which is incorporated herein by reference.

The SMS interface 16 provides communication between A/S system 12 and a service management system (SMS) (not shown), which maintains a record of new service calls and changes to the attributes of pending service calls, as received from customers. The user interface 16 enables a system user, such as a service call dispatcher, to communicate with the A/S system 12, and provides a graphical representation of recommended assignment and scheduling solutions generated by A/S system 12. Via user interface 16, the system user can enter changes to both the attributes of pending service calls and the attributes of technicians operating in the field service environment, and may request reevaluation of previous assignment and scheduling recommendations by A/S system 12.

In response to new service calls, call cancellations, call attribute changes, technician attribute changes, and requests for reevaluation, as received from SMS interface 14 or user interface 16, the A/S system 12 activates two software process modules that cooperate to reach an assignment and scheduling solution. Specifically, as shown in FIG. 1, A/S system 12 comprises an assigner module 20, responsible for assigning new and pending service calls among the technicians, and a scheduler module 22, invoked by the assigner module 20 to generate a schedule of the calls assigned to each individual technician. The system and method of the present invention are directed specifically to the scheduling operation of scheduler module 22, and to the graphical display operation of user interface 16.

As described in detail in the aforementioned U.S. Pat. No. 5,467,268, to Elizabeth M. Sisley and John E. Collins, the assigner module 20 searches for potential assignments of service calls among the service technicians, and evaluates a portion of an objective function relating to the desirability of particular associations of calls and technicians. The assigner module 20 invokes scheduler module 22 to search for potential schedules of the calls assigned to a particular technician, and then to evaluate a portion of the objective function relating to time. Each of the potential schedules searched by scheduler module 22 represents a sequence of the service calls in finite time intervals. Thus, a complete assignment of a service call involves both an association of the call with a technician, as determined by assigner module 20, and a scheduling of the call at a particular time, as determined by the scheduler module 22.

For each invocation of scheduler module 22, the assigner module 20 passes to scheduler module 22 a set of service calls assigned to a particular technician, as well as a set of call attributes identifying the type of service activity associated with each of the calls. In response, the scheduler module 22 performs a recursive depth-first search that explores potential schedules of the service calls assigned to the technician to determine the most efficient schedule. The scheduler module 22 recursively generates each potential schedule by building a sequence of the service calls assigned to a technician one-call-at-a-time, and determines the efficiency, or "stress" value, of each schedule based on a variety of time-related factors.

The scheduler module 22 typically assigns a start time to the first call in the sequence based on the beginning of the work day plus an initial travel time from the technician's starting location. Because the actual duration of a service call is uncertain, however, scheduler module 22 assigns a completion time to the first call based on an estimated duration of the call. The estimated duration of a call may be specified by the system user and stored in a call duration file (not shown) referenced by the scheduler module 22. For example, the system user may estimate durations for several types of calls based on an average of the durations of past calls involving the same service activities.

The scheduler module 22 assigns a start time to the next call by adding an estimated travel time to the completion time of the preceding call in the sequence. The estimated travel time represents the time necessary for the technician to travel between the customer locations associated with the preceding call and the next call. Thus, scheduler module 22 determines the start time for the next call based on both the estimated duration of the preceding call and an estimated travel time between the preceding call and the next call. The travel time may be based on an average of past travel times between the locations associated with the calls, or may be estimated based on the actual distances between locations. For example, scheduler module 22 may ascertain the locations associated with particular service calls by referring to postal zip code centroid information. The scheduler module 22 assigns a completion time to the next call by adding the estimated duration of the next call to the start time. In this manner, scheduler module 22 determines the completion time for the next call based on the estimated duration of the preceding call, the estimated travel time between the preceding call and the next call, and the estimated duration of the next call. The scheduler module 22 recursively builds the remainder of the sequence in the same manner by continuing to place one of the remaining calls next in the sequence until none of the calls remains unscheduled.

Figure 2:
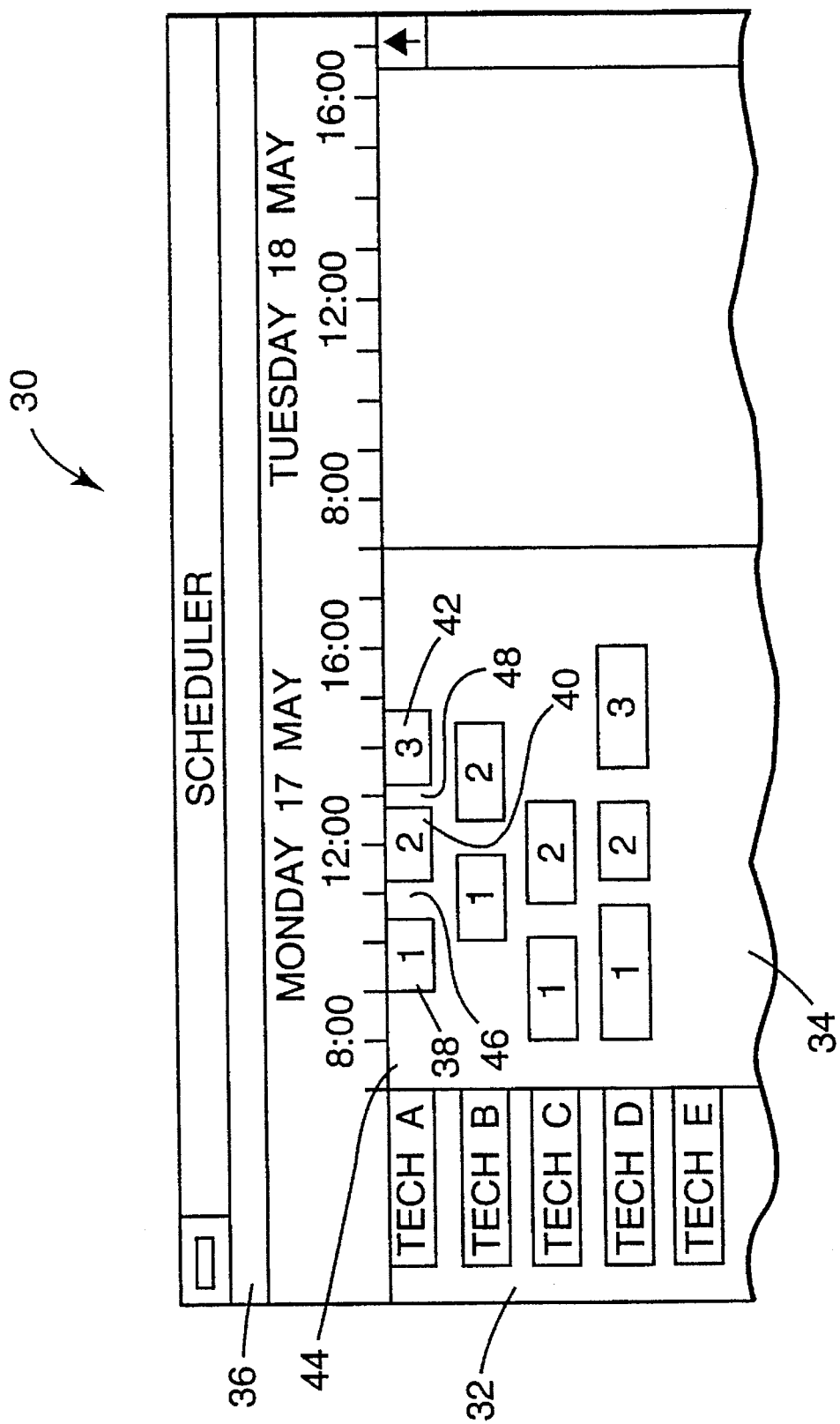
FIG. 2 is an example of a user interface displaying a representation of a set of schedules in accordance with the present invention.

FIG. 2 is an example of a graphical representation of a set of schedules generated by the scheduler module 22, as displayed by user interface 16. The user interface 16 may be implemented, for example, using X-Windows, and preferably displays an interactive scheduler window 30 containing a representation of the schedules for selected technicians. The scheduler window 30 includes a technician field 32 containing a representation of a particular group of technicians under evaluation by the system user, a schedule field 34 containing a representation of the calls assigned to each of the technicians and the particular times for which the calls are scheduled, and a command bar 36 containing representations of standard window control commands.

In FIG. 2, the technician field 32 displays a group of technicians A, B, C, D, and E operating in the field service environment. The schedule field 34 represents the existing schedules of the technicians, as generated by the scheduler module 22, subject to approval or modification by the system user. The schedule field 34 in FIG. 2 indicates that technician A has been assigned first, second, and third scheduled calls represented by call blocks 38, 40, and 42. The call blocks 38, 40, and 42 represent scheduling of the calls between 9:00 and 15:00 on Monday, May 17. Specifically, call blocks 38, 40, and 42 indicate assigned start times for the first, second, and third calls of approximately 9:00, 11:15, and 1:15, respectively. The completion times indicated by call blocks 38, 40, and 42, respectively, are approximately 10:45, 12:45, and 2:45.

The schedule field 34 also includes time blocks 44, 46, 48 representing travel times. Time block 44 indicates the initial travel time, from the beginning of the day, required for the technician to travel from headquarters, or from a location associated with an otherwise unavailable time, to the customer location associated with the first call. Travel times 46 and 48 separate the start and completion times of the consecutively scheduled calls indicated by call blocks 38 and 40, and call blocks 40 and 42, respectively. The time blocks 46, 48 represent the time required by the technician to travel from a customer location associated with the preceding call to a customer location associated with the next call.

Although the schedules generated by scheduler module 22, as shown in FIG. 2, are useful for managing and predicting technician performance, the start and completion times of each call nevertheless are based only on estimations of uncertain durations. The uncertainty of the durations makes the reliable scheduling of future service calls difficult, and results in a questionable degree of confidence in time commitments made to customers.

In accordance with the present invention, to increase the confidence of time commitments, the scheduler module 22 is configured to generate both a first schedule based on expected durations of the service calls, and a second schedule based on pessimistic durations of the service calls. The expected durations may represent average durations, whereas the pessimistic durations represent longer than average durations. By scheduling according to average durations, the first, "expected" schedule enables good overall management of technician performance. By scheduling according to longer durations, the second, "pessimistic" schedule enables the user to make time commitments to customers with a greater degree of confidence. Thus, after the scheduler module 22 has selected a call to be placed next in the sequence of calls of a potential schedule, as described in the aforementioned copending U.S. patent application Ser. No. 08/201,664, of Elizabeth M. Sisley and John E. Collins, filed Feb. 25, 1994, and entitled "SYSTEM AND METHOD FOR RESOURCE ASSIGNMENT AND SCHEDULING," now U.S. Pat. No. 5,467,268, the scheduler module 22 must assign expected and pessimistic start times and expected and pessimistic completion times to the call, in accordance with the present invention.

If the subject call is the first call in the sequence, the expected and pessimistic start times assigned by the scheduler module 22 are simply the beginning of the work day plus the initial travel time between the location of the technician's headquarters, or a location associated with an otherwise unavailable time, and the location associated with the first call. In contrast, if the call is a subsequent call in the sequence, the expected and pessimistic start times assigned by the scheduler module 22 are based, respectively, on the sums of the expected and pessimistic durations of the preceding calls in the sequence, the initial travel time, and the travel times between locations associated with consecutive preceding calls. The scheduler module 22 further assigns expected and pessimistic completion times to the first call in the sequence based, respectively, on only the expected and pessimistic durations of the first call and the initial travel time. If the call is a subsequent call in the sequence, however, the expected and pessimistic completion times assigned by the scheduler module 22 are based on the sums of the expected and pessimistic durations, respectively, of the preceding calls in the sequence and the call to which the completion time is assigned, the initial travel time, and the travel times between locations associated with consecutive preceding calls.

Figure 3:
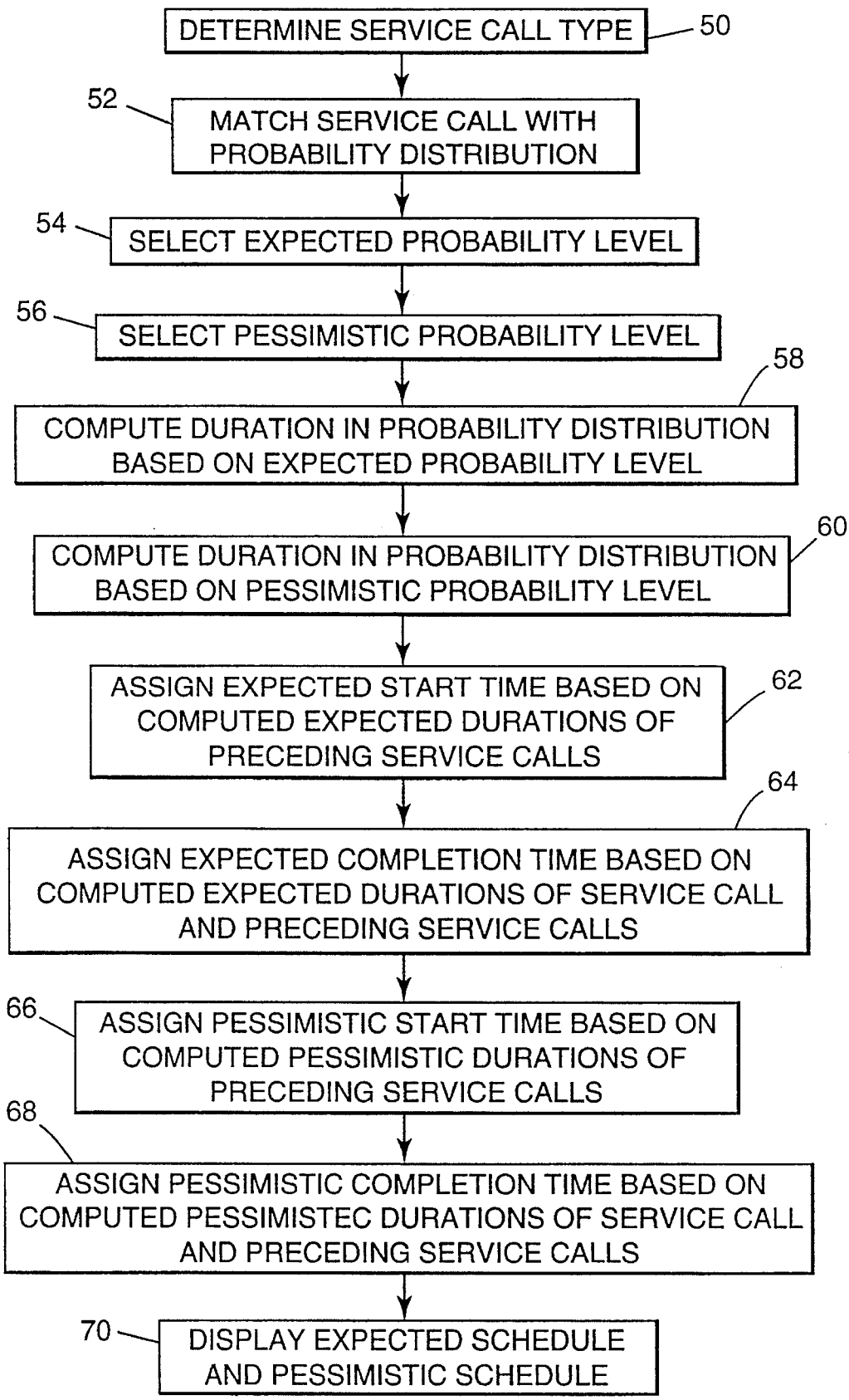
FIG. 3 is a flow diagram illustrating a technique for generating an expected schedule and a pessimistic schedule of resource requests, in accordance with the present invention.

The flow diagram of FIG. 3 illustrates the operation of the scheduler module 22 in assigning expected and pessimistic start and completion times to an individual call, in accordance with the present invention. As indicated by block 50, the scheduler module 22 first determines the type of service activity associated with the call based on the call attributes passed by the assigner module 20. The scheduler module 22 then references a call duration file (not shown) to determine expected and pessimistic durations for service calls associated with the same type of activity. The call duration file may contain a plurality of statistical probability distributions providing duration variability information for each type of activity. The call duration file alternatively may contain fixed expected and pessimistic duration pairs for the particular type of activity, as entered by the system user. The system user may enter the fixed durations in the event that variability information is either unavailable or not yet developed for the particular field service environment. If the call duration file contains neither variability information nor fixed durations for the subject activity, the scheduler module 22 simply substitutes a default value for both the expected and pessimistic durations.

If the call duration file contains fixed expected and pessimistic duration pairs, the scheduler module 22 accepts them for use in assigning expected and pessimistic start and completion times. However, if the call duration file contains variability information, the scheduler module 22 matches the call with one of the statistical probability distributions, as indicated by block 52 of FIG. 3, based on the type of activity associated with the call. The duration file may contain probability distributions differentiated by both the type of service activity and the particular technician involved. The duration file thereby includes variability information that considers the different durations attributed to individual technicians. In this case, scheduler module 22 matches the call with an appropriate probability distribution based on the type of service activity involved and the identity of the particular technician, as determined by the call attributes.

Figure 4:
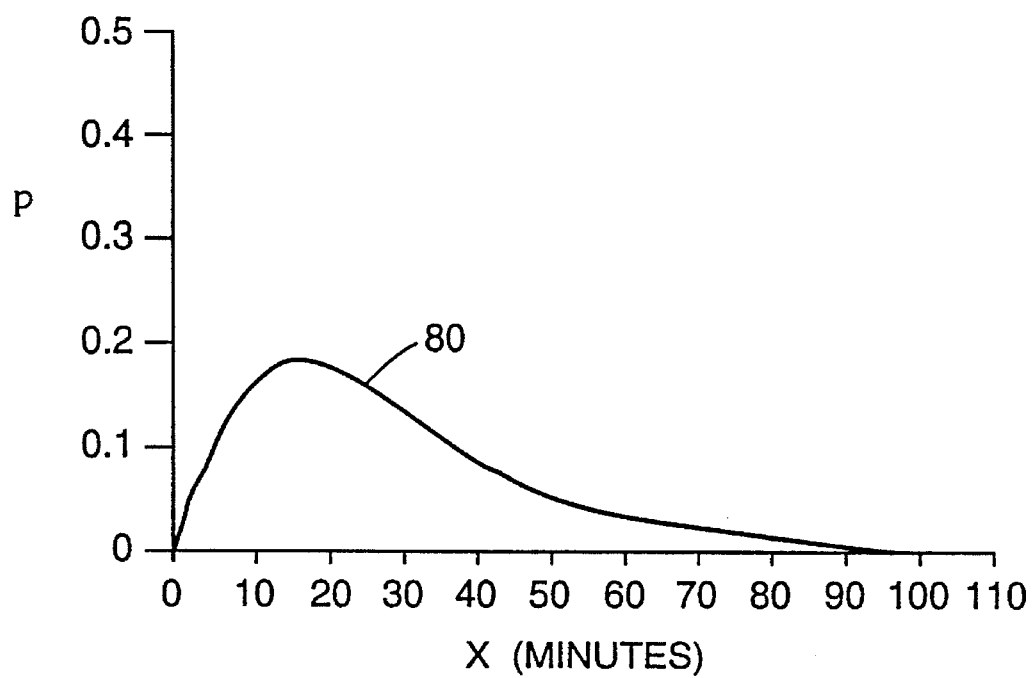
FIG. 4 is an example of a probability distribution for the potential duration of a resource request.

An example of a statistical probability distribution is shown in the graph of FIG. 4, in which the curve 80 is a probability density function representing the probability ρ that a particular call will have a duration x, in minutes. A probability distribution can be constructed by monitoring the actual durations of calls of the same type as they are completed over a period of time. If variance in individual technician performance is a consideration, probability distributions can be constructed by monitoring durations of calls of the same type that involve the same technician.

Once the call has been matched with the appropriate probability distribution, the scheduler module 22 selects a first probability level for the expected schedule and a second probability level for the pessimistic schedule, as indicated by blocks 54 and 56, respectively. The levels of probability represent relative degrees of certainty, or "confidence" in the call durations in the respective schedules. For example, a probability level of 0.5 affords a fifty percent degree of confidence in the expected schedule, which may be sufficient for managing technician performance. A probability level of 0.5 corresponds to the median of the distribution, and means that the actual duration of the call will be less than or equal to the expected duration fifty percent of the time. A much higher degree of confidence may be required for the pessimistic schedule to ensure that most of the time commitments promised to customers are satisfied. Thus, if a probability level of 0.9 is selected, the system user can be ninety percent confident that the actual durations of the calls will be less than or equal to the pessimistic durations determined by the scheduler module 22. With a probability level of 0.9, the system user can be ninety percent certain that a time commitment to a customer will not be broken.

As indicated in blocks 58 and 60, respectively, the scheduler module 22 computes durations in the probability distribution matched with the respective call based on the expected and pessimistic probability levels to determine the expected and pessimistic durations. With reference to the graph shown in FIG. 4, a duration can be computed based on the probability level by integrating along the density curve 80. For example, the duration T for a probability level of 0.9 can be ascertained according to the expression:

$$0.9 \int_0^T \delta(x), \tag{1}$$

where $\delta(x)$ is the density function represented by curve 80 of FIG. 4.

For scheduling, the duration computed based on the expected probability level then serves as the expected duration of the call, and the duration computed based on the pessimistic probability level serves as the pessimistic duration of the call. The expected completion times are determined for each of the calls as they are placed in the sequence based on the expected durations. As a result, scheduler module 22 can assign an expected start time to a new call by adding the estimated travel time to the expected completion time for the immediately preceding call. The expected start time of the new call is then based on the expected durations computed for the preceding calls in the sequence plus travel times, as indicated by block 62. The scheduler module 22 assigns the expected completion time to the new call by adding the expected duration for the new call to the expected start time for the new call. Thus, the expected completion time is based on the expected durations computed for the preceding calls, the expected duration computed for the new call to which the completion time is assigned, and the travel times, as indicated by block 64.

Similarly, scheduler module 22 assigns the pessimistic start time to a new call by adding the estimated travel time to the pessimistic completion time for the immediately preceding call. In this manner, the pessimistic start time for the new call is based on the pessimistic durations computed for the preceding calls in the sequence plus travel times, as indicated by block 66. The scheduler module 22 assigns the pessimistic completion time to the new call by adding the pessimistic duration for the new call to the pessimistic start time for the new call, such that the pessimistic completion time is then based on the pessimistic durations computed for the preceding calls, the pessimistic duration computed for the call to which the completion time is assigned, and the travel times, as indicated by block 68. For the first call in the sequence, of course, the expected and pessimistic start times both correspond to the first available time on the schedule plus the initial travel time, and the expected and pessimistic completion times are then based only on the expected and pessimistic durations, respectively, computed for the first call.

The travel times between locations associated with consecutively scheduled calls may also vary. Therefore, the scheduler module 22 may also reference a travel time file (not shown) similar to the call duration file when incorporating travel time into the schedule. A travel time file may provide, for example, expected and pessimistic travel times for travel between the same two locations. As in the call duration file, the expected and pessimistic travel times may be provided in the form of statistical probability distributions for travel time or fixed expected and pessimistic travel time pairs. Thus, by determining the locations associated with consecutively scheduled calls, based on the call attributes passed by assigner module 20, the scheduler module 22 can match a particular travel interval with a set of expected and pessimistic travel times in the travel time file.

As an alternative to selecting a first probability level for the expected schedule, scheduler module 22 may simply determine the mean duration in the probability distribution matched with the call. The scheduler module 22 then accepts the mean duration as the expected duration of the call. In most real-world probability distributions, the mean duration does not correspond to a probability level of 0.5, but may be selected because it gives the best overall estimate for the schedule. The operation of the scheduler module 22 in generating an expected schedule based on mean durations and a pessimistic schedule based on probability levels is illustrated in the flow diagram shown in FIG. 5.

The scheduler module 22 first determines the type of service activity associated with each of the service calls, as indicated by block 82, and matches the respective call with a corresponding probability distribution, as indicated by block 84. Again, the probability distributions may be further differentiated according to the particular technician handling the call. For the expected schedule, the scheduler module 22 calculates a mean value for the durations in the probability distribution, as indicated by block 86. The mean value serves as the expected duration for the respective call. The scheduler module 22 then selects a pessimistic probability level, as indicated by block 88, based on a preset value or user input. As indicated by block 90, the scheduler module 22 computes a duration in the probability distribution matched with the respective call based on the pessimistic probability level to determine the pessimistic duration.

The expected start time is then assigned by adding an estimated travel time to the expected completion time of the preceding call, such that the expected start time is based on the mean durations calculated for the preceding calls in the sequence plus travel times, as indicated by block 92. The scheduler module 22 assigns the expected completion time by adding the mean duration calculated for the call to the expected start time for the call. As a result, the expected completion time is based on both the mean durations calculated for the preceding calls in the sequence and the mean duration of the call to which the expected completion time is assigned, as indicated by block 94, plus travel times. The scheduler module 22 then assigns the pessimistic start time based on the durations computed for the preceding calls in the sequence, as indicated by block 96, by adding the estimated travel time to the pessimistic completion time of the immediately preceding call. As indicated by block 98, the pessimistic completion time assigned by scheduler module 22, which represents the addition of the pessimistic duration of the call to the pessimistic start time, is then based on the pessimistic durations computed for the preceding calls, the pessimistic duration computed for the call to which the completion time is assigned, and the travel times.

In summary, the scheduler module 22 may be configured to query the system user via user interface 16 for both the expected and pessimistic probability levels, may refer to expected and pessimistic probability levels previously set by the system user, or may query the user for only pessimistic probability levels, determining the expected durations based on mean values. In all cases, however, the system user reserves the ability to manage technician performance and time commitments according to individual preference, or organizational policy, providing added flexibility.

Figure 5:
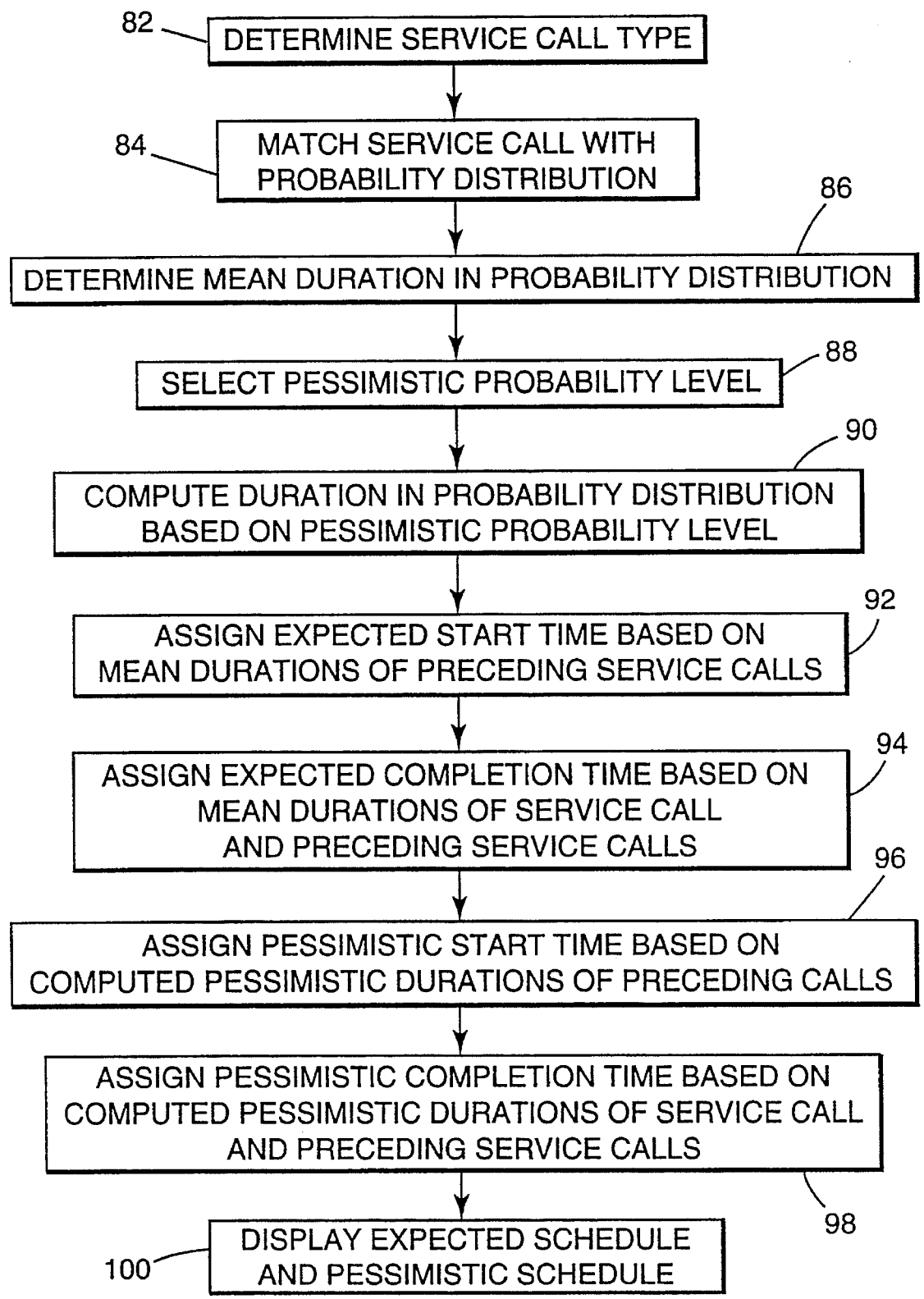
FIG. 5 is a flow diagram illustrating another technique for generating an expected schedule and a pessimistic schedule of resource requests, in accordance with the present invention.
Figure 6:
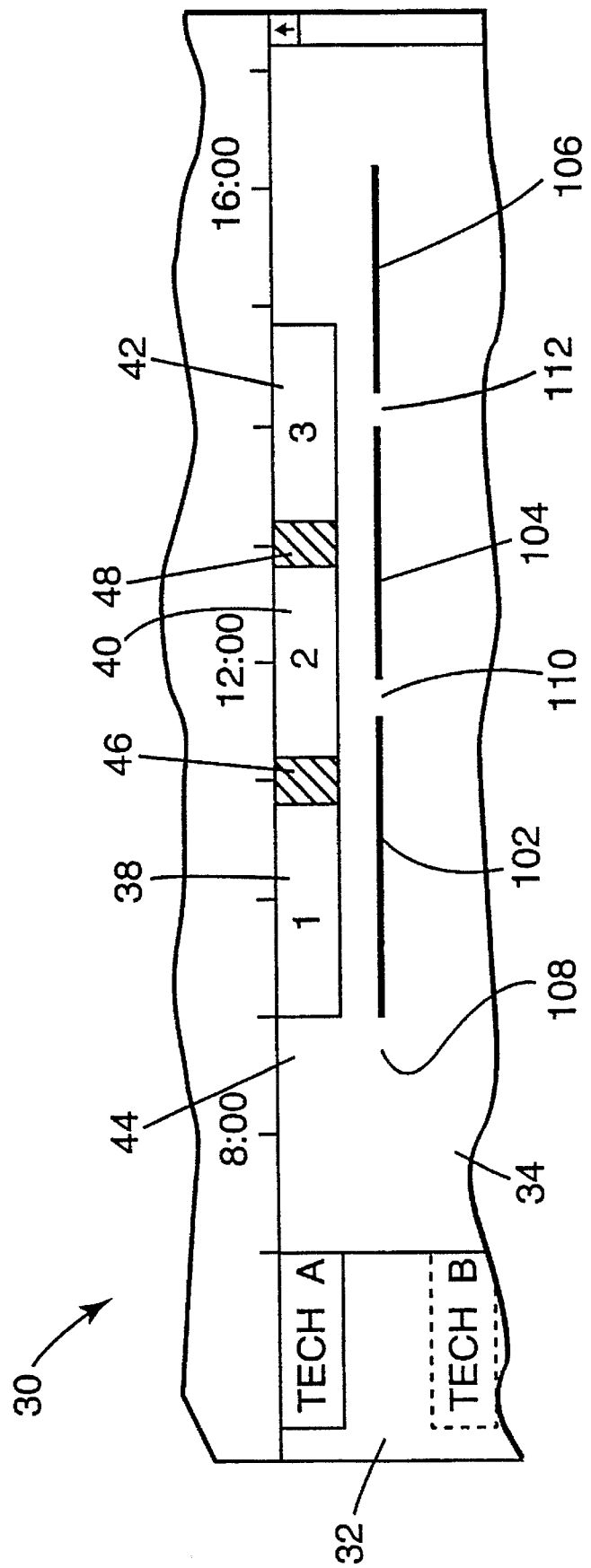
FIG. 6 is an example of a user interface simultaneously displaying a representation of an expected schedule and a pessimistic schedule of resource requests generated as in FIG. 3 or FIG. 5.

After the scheduler module 22 has assigned both expected and pessimistic start and completion times to each call in the recursively-generated sequence, the user interface 16 simultaneously displays representations of the resulting expected and pessimistic schedules in the schedule field 34 of scheduler window 30, as indicated by block 70 of FIG. 3 and block 100 of FIG. 5. As shown in FIG. 6, for example, the expected schedule for technician A is indicated by the display of call blocks 38, 40, and 42. The call blocks 38, 40, 42 represent, respectively, the expected durations of the service activities associated with the first, second, and third calls assigned to technician A. The user interface 16 provides a representation of the pessimistic schedule for technician A by displaying time bars 100, 102, and 104 under the expected schedule. The time bars 100, 102, 104 represent, respectively, the pessimistic durations of the first, second, and third calls assigned to technician A. The representation of the pessimistic schedule also includes time blocks 106, 108, and 110, corresponding to the travel times indicated by time blocks 44, 46, and 48 in the expected schedule. Alternatively, pessimistic travel times may be displayed, as determined by reference to the travel time file. The user interface 16 may provide a toggle button for the system user to turn the display of the pessimistic schedule on and off. Although in many cases the system user may be able to identify the time bar 100, 102, 104 that corresponds to a particular call block 38, 40, 42 by horizontal alignment, the propagation of pessimistic durations throughout the pessimistic schedule may result in significant horizontal skew. Therefore, the user interface 16 may display corresponding call blocks 38, 40, and 42 and time bars 100, 102, and 104 with matching colors to aid in identification.

Figure 7:
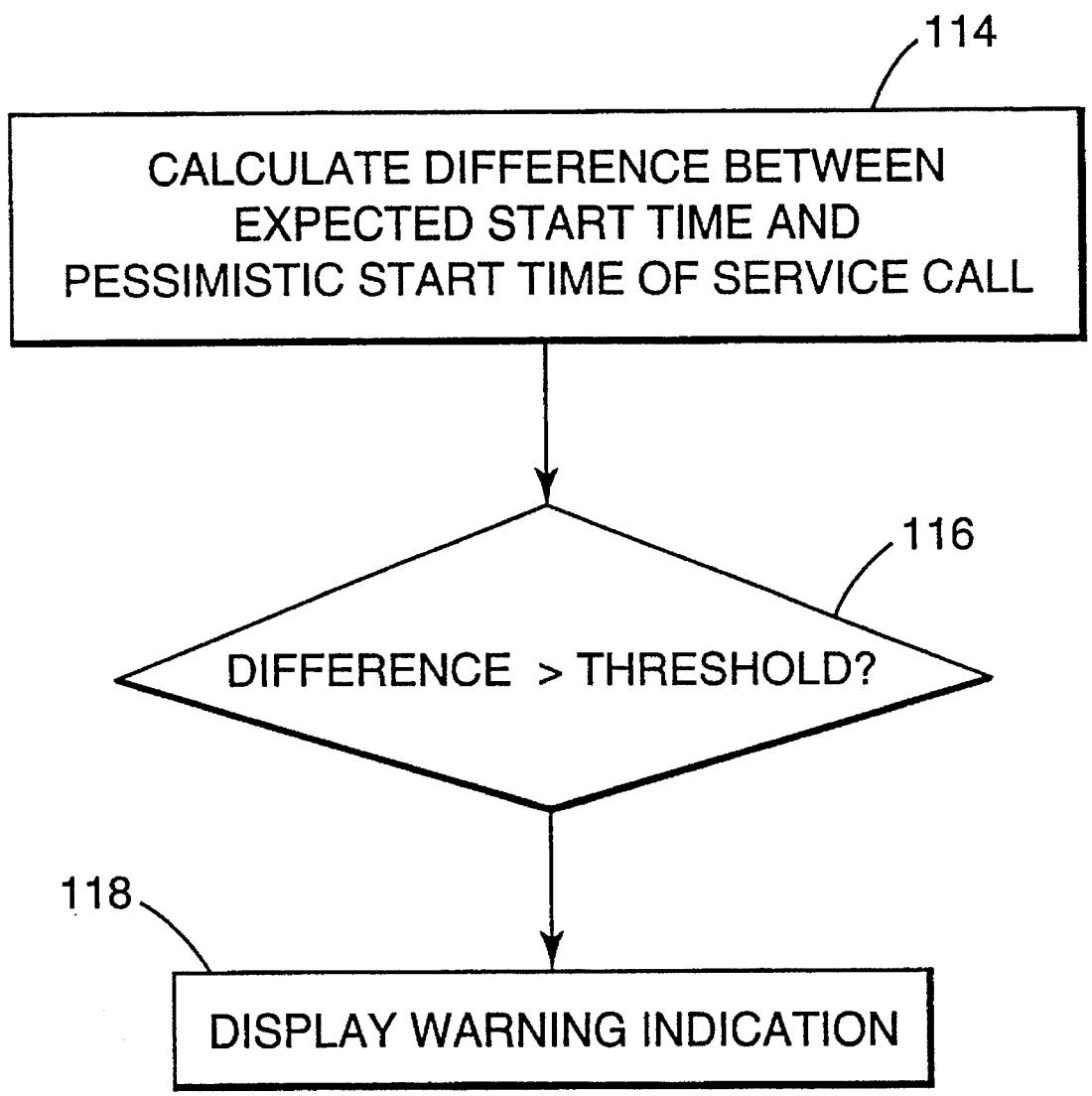
FIG. 7 is a flow diagram illustrating the generation of a warning indication in response to excessive variability in the expected and pessimistic schedules, in accordance with the present invention.

In addition to displaying the expected and pessimistic schedules, the user interface 16 may display a warning indication, possibly accompanied by an audible signal, when the difference between the expected and pessimistic start times for a particular call exceeds a predetermined threshold. As indicated by block 114 of FIG. 7, the scheduler module 22 calculates the difference between the expected and pessimistic start times for each call in the sequence. The scheduler module 22 compares the difference to the threshold, as indicated by block 116, and, if the difference exceeds the threshold, transmits a warning signal directing the user interface 16 to display the warning indication, as indicated by block 118. The warning indication serves to advise the system user that a time commitment should not be made for the particular call due to art excessive degree of variation between the expected and pessimistic start times of the call. One example of a warning indication is the display of a call block and a corresponding time bar in a flashing manner.

Figure 8:
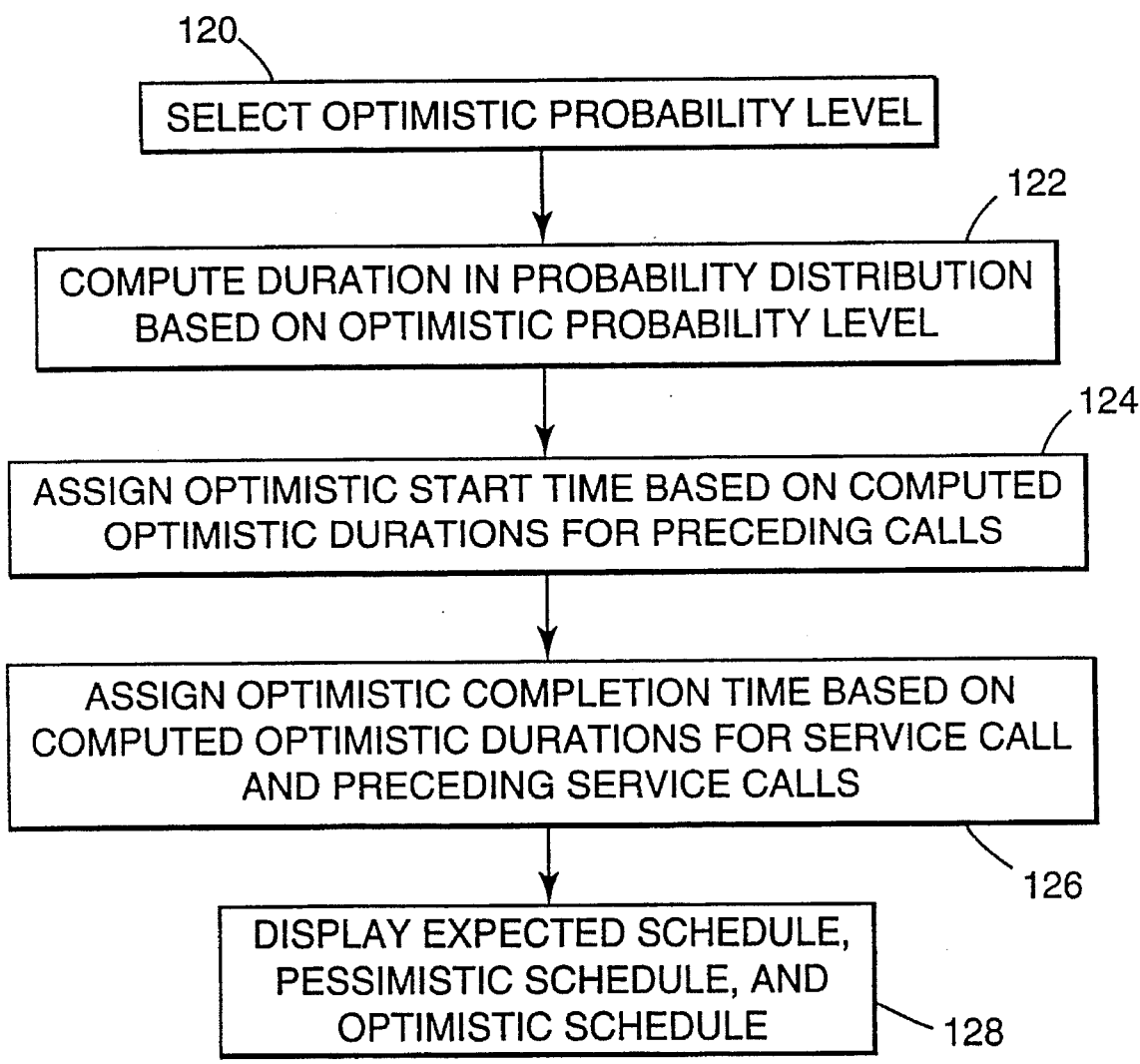
FIG. 8 is a flow diagram illustrating a technique for generating an optimistic schedule of resource requests, in accordance with the present invention.

As indicated by the flow diagram of FIG. 8, the scheduler module 22 may also generate an optimistic schedule of the calls assigned to a service technician. Whereas the expected schedule enables good overall management of technician performance, and the pessimistic schedule enables the user to make time commitments to customers with a greater degree of confidence, the optimistic schedule conceivably may be used as a pacing tool to motivate technicians to adhere to a better than expected schedule. To generate the optimistic schedule, the scheduler module 22 first selects an optimistic probability level, as indicated by block 120. Because the optimistic schedule is intended to represent durations better than the expected durations, the system user should set the optimistic probability level lower than the expected probability level. Based on the optimistic probability level, scheduler module 22 then computes a duration in the same probability distribution previously matched with the call during generation of the expected and pessimistic schedules, as indicated by block 122. The scheduler module 22 assigns an optimistic start time to the call, as indicated by block 124, based on the optimistic durations computed for the preceding calls in the sequence and the travel times between the preceding calls, by adding the estimated travel time to the optimistic completion time of the immediately preceding call. As indicated by block 126, the optimistic completion time assigned to the call by the scheduler module 22 is then based on the optimistic durations computed for the preceding calls, the optimistic duration computed for the call to which the completion time is assigned, and the preceding travel times.

Figure 9:
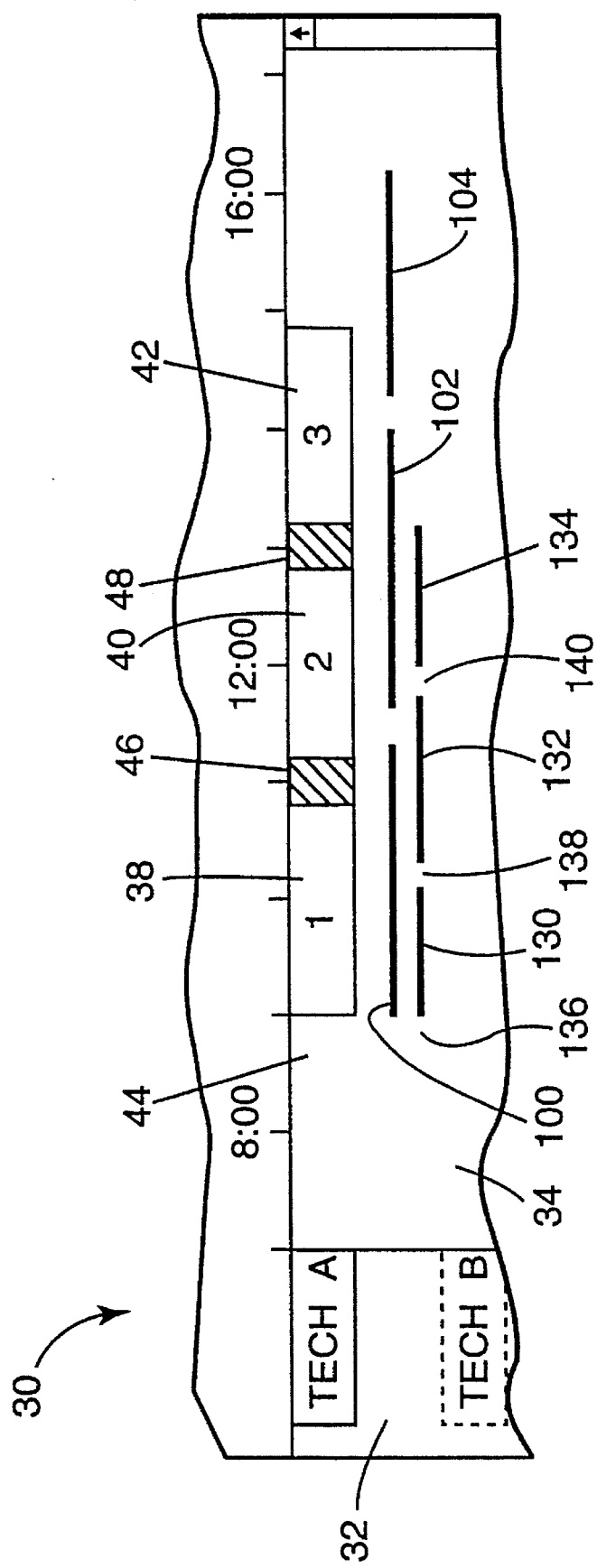
FIG. 9 is an example of a user interface simultaneously displaying an expected schedule, a pessimistic schedule, and an optimistic schedule of resource requests generated as in FIGS. 3 or 5, and FIG. 8.

After the scheduler module 22 has assigned optimistic start and completion times to all of the calls in the sequence, the user interface 16 simultaneously displays to the system user representations of the expected, pessimistic, and optimistic schedules in the schedule field 34 of scheduler window 30, as indicated by block 128 of FIG. 8. As shown in FIG. 9, for example, the user interface 16 displays the optimistic schedule of the calls assigned to technician A in the form of time bars 130, 132, and 134 below the expected and pessimistic schedules. The time bars 130, 132, and 134 represent, respectively, the optimistic durations computed for the first, second, and third calls represented by call blocks 38, 40, and 42. The representation of the optimistic schedule also includes time blocks 136, 138, and 140, corresponding to the travel times indicated by time blocks 44, 46, and 48 in the expected schedule. As in the case of the pessimistic schedule, the user interface 16 may provide a toggle button for the system user to turn the display of the optimistic schedule on and off, and may display corresponding call blocks 38, 40, and 42, time bars 100, 100, and 104, and time bars 130, 132, and 134 with matching colors to aid in identification.

Figure 10:
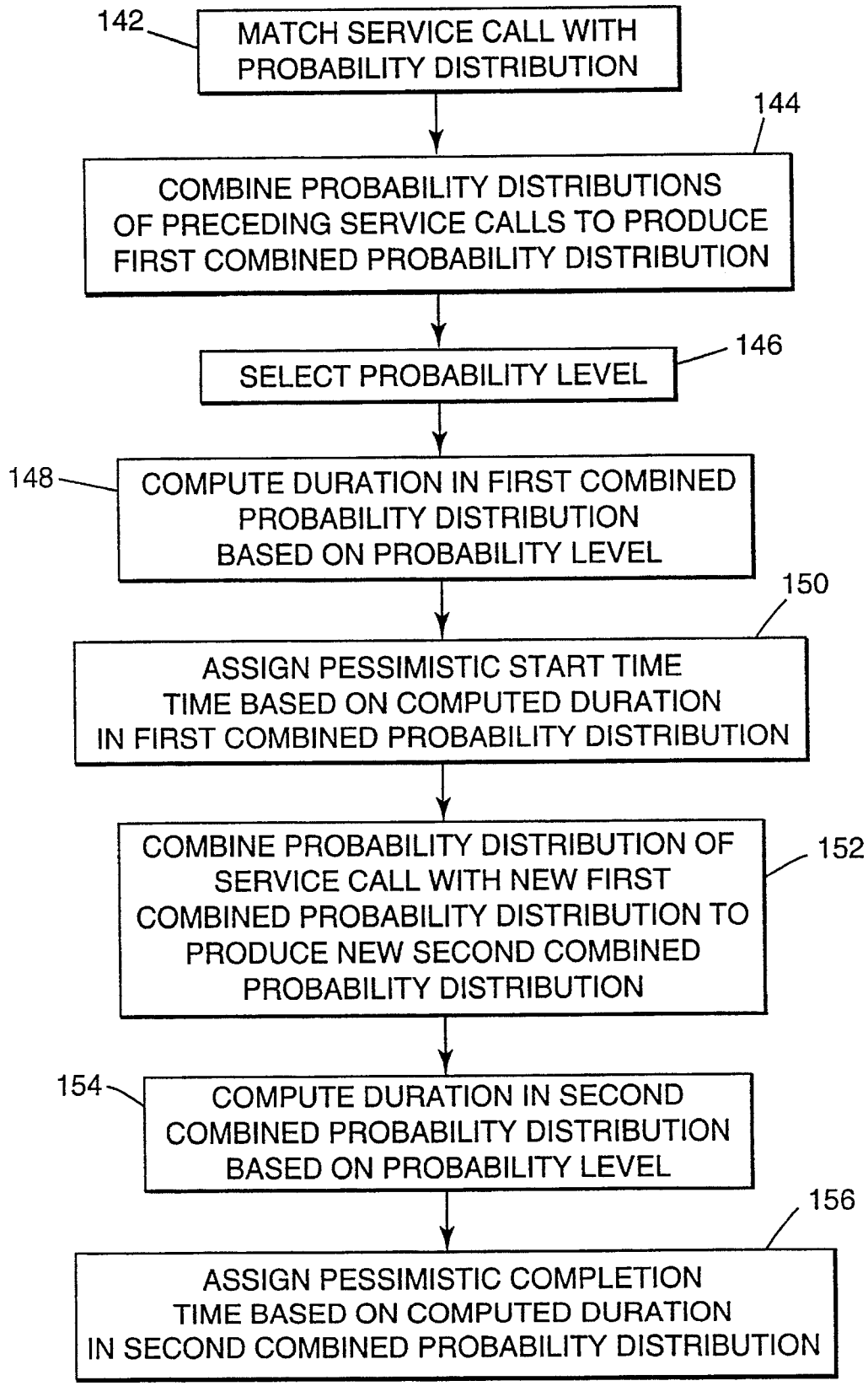
FIG. 10 is a flow diagram illustrating another technique for generating a pessimistic schedule of resource requests based on a combination of probability distributions for the durations of consecutively scheduled resource requests, in accordance with the present invention.

In accordance with the present invention, the scheduler module 22 alternatively may be configured to generate the pessimistic schedule based on combined probability distributions for the durations of the service calls in a sequence. As will be described, the use of combined probability distributions increases the efficiency of the pessimistic schedule, enabling the system user to make earlier time commitments with an equivalent degree of confidence. The operation of the scheduler module 22 in generating a pessimistic schedule based on combined probability distributions is illustrated in the flow diagram of FIG. 10.

The scheduler module 22 matches each of the service calls assigned to a particular technician with one of a plurality of statistical probability distributions stored in the call duration file based on the type of service activity associated with the respective call, as indicated by block 142, and possibly based on the particular technician handling the call. The scheduler module 22 assigns a pessimistic start time for a particular call by adding an estimated travel time to the pessimistic completion time of the immediately preceding call. However, the determination of the pessimistic start time by scheduler module 22 relies directly on the generation of a first combined probability distribution that combines the probability distributions of the preceding calls in the sequence, as indicated by block 144. Specifically, scheduler module 22 selects a pessimistic probability level entered or preset by a system user, as indicated by block 146, and computes a duration in the first combined probability distribution based on the probability level, as indicated by block 148.

The pessimistic completion time of the immediately preceding call is the computed duration plus travel times, relative to the start of the schedule. Thus, the pessimistic start time of the next call is based on the computed duration in the first combined probability distribution, as indicated by block 150, plus intervening travel times. To determine the pessimistic completion time for the next call, scheduler module 22 combines the probability distribution matched with the particular call with the first combined probability distribution generated for the preceding calls to produce a second combined probability distribution, as indicated by block 152. The scheduler module 22 computes a duration in the second combined probability distribution based on the selected probability level, as indicated by block 154. The scheduler module 22 then assigns the pessimistic completion time to the next call based on the computed duration and the intervening travel times, as indicated by block 156. Because the computed duration represents the aggregate duration of the preceding service calls and the next call, the scheduler module 22 assigns the pessimistic completion time relative to the beginning of the schedule, with travel times included.

The scheduler module 22 combines probability distributions by convolution, effectively multiplying them such that the combined probability distribution is the product of the probability distributions matched with the preceding calls and the probability distribution matched with the call to which the completion time is to be assigned. A combined probability distribution is generated to determine the pessimistic completion time for each preceding call in the sequence. Therefore, the probability distribution for a later call can be combined with the previous combined probability distribution instead of recombining all probability distributions on an individual basis. The calculation of the combined probability distributions by scheduler module 22 may be either exact or approximate. For k independent exponential variables in sequence, for example, the combination of probability distributions is represented by a k-erlang variable. Thus, the probability distribution ρ(x) for the combined durations of k service calls having exponential distributions in sequence, as determined by the scheduler module 22, can be given by:

$$\rho(x) = 1 - e^{-x/\beta} \sum_{j=0}^{k-1} 1/j! \, (x/\beta)^j, \qquad (2)$$

where x is the duration of a particular service call and β is a scale parameter equal to r/k, where r is the mean duration in the probability distribution. For the start time of a call m+1 in the sequence, the scheduler module 22 computes the combined durations of the preceding calls 1 through m where the combined density function of calls 1 through m is a k-erlang variable by Newton's method with the following iteration function:

$$x_{n+1} = x_n - \frac{k! \, (\beta)^{k+1}}{x_n^k} \left[ e^{-x/\beta}(1-\rho) - \sum_{j=0}^{k-1} 1/j! \, (x_n/\beta)^j \right]. \qquad (3)$$

The scheduler module 22 effectively reduces the variability of service calls scheduled farther in the future by scheduling service calls according to a total duration derived from a combined probability distribution. Specifically, as the number of service calls on the schedule increases, the total duration of all service calls approaches the sum of the average durations of the calls. Therefore, if the same probability level is applied both to the combined probability distribution for all calls in a sequence, and in isolation to each individual probability distribution, the total pessimistic duration derived from the combined probability distribution clearly will be less than the sum of the pessimistic durations derived from the individual probability distributions.

Figure 11:
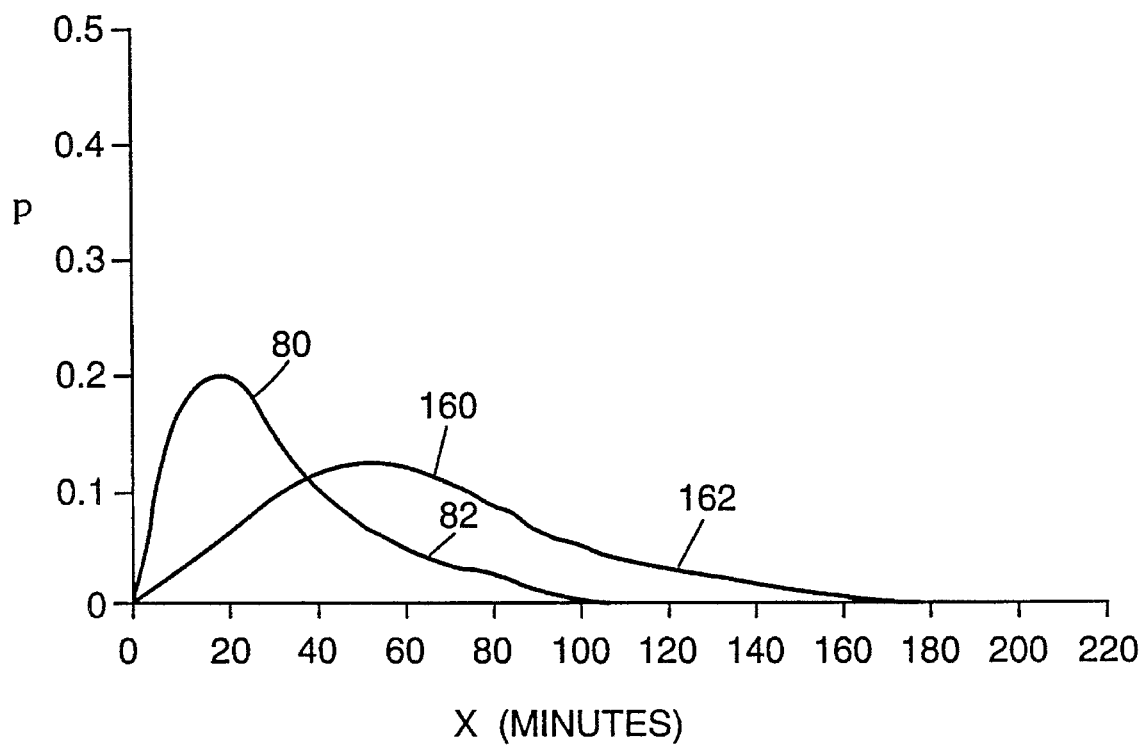
FIG. 11 is an example of a combined probability distribution for the durations of consecutively scheduled resource requests.

FIG. 11 is an example of a density curve 80 representing a probability distribution for the duration of an individual call, and a density curve 160 representing a combined probability distribution for the durations of two consecutively scheduled calls. For the example shown in FIG. 11, it is assumed that the consecutively scheduled calls are associated with the same service activities and are therefore matched with identical probability distributions. The density curve 80 represents a 2-erlang probability distribution for the duration of each of the calls in the sequence. A 2-erlang probability distribution has been found to be typical for a field service environment. The density curve 160 represents a combination of two identical 2-erlang probability distributions by convolution, and thus represents a 4-erlang probability distribution.

The curve 80 has a "tail" 82 that extends to the maximum duration for an individual service call, whereas the "tail" 162 of curve 160 extends to the maximum aggregate duration of the two consecutively scheduled calls. In the example of FIG. 11, the individual curve 80 asymptotically approaches a probability level of 0. The combined curve 160 theoretically will approach a corresponding probability level of 0 at exactly twice the maximum duration of the individual curve 80. However, the tail 162 of the combined curve 160 will tend toward the probability level much more quickly than tail 82, such that longer aggregate durations are less probable than longer individual durations.

Assuming that the system user has selected a probability level of 0.9, and that there are two consecutive service calls in a sequence, the pessimistic durations derived from the individual probability distributions each carry a confidence level of 0.9. The sum of the individual pessimistic durations similarly carries a confidence level of 0.9. However, if the individual probability distributions are combined, the aggregate pessimistic duration now corresponds to a probability level in the combined probability distribution of:

$$\rho_c = 1.0 - [(1-\rho_1) \times (1-\rho_2)], \qquad (4)$$

where ρc is the combined probability level, $\rho_1$ is the probability level for the first call, and $\rho_2$ is the probability level for the second call. If $\rho_1$ and $\rho_2$ are both equivalent to 0.9, equation (4) will yield a combined probability level $\rho_c$ of:

$$1.0 - [(1.0-0.9) \times (1.0-0.9)] = 0.99.$$

This higher probability level reflects the reduced variation in the combined probability distribution. The scheduler module 22 takes advantage of the reduced variation by using the probability level specified by the system user not with the individual probability distributions, but with the overall combined probability distribution. As a result, the aggregate pessimistic duration for the calls in the sequence is less than the sum of the individual pessimistic durations, enabling the system user to make earlier time commitments with the same level of confidence.

In accordance with the present invention, the scheduler module 22 also may be configured to modify the schedule as service calls are completed by a technician, or as the actual running duration of an active service call progresses, thereby providing an updating feature. A service call is "active" if a technician is presently serving the call. The SMS interface 14 and user interface 16 enable the scheduler module 22 to monitor the actual durations of the service calls, in order to update the expected, pessimistic, and optimistic schedules. Specifically, the assigner module 20 receives notification of the start and completion times of preceding service calls from either the SMS via SMS interface 14 or the system user via user interface 16. The assigner module 20 references a real-time clock (not shown) upon receipt of such notification to determine start and completion times for the call, and "time-stamps" the call. In addition, as the running duration of an active call progresses without notification of a completion time, the assigner module 20 periodically time-stamps the call with the present time. Thus, the running duration is the minimum completion time possible for the call. At periodic intervals during the active duration of a call, and upon completion of the call, the assigner module 20 passes the time-stamped call and the other calls assigned to the same technician to the scheduler module 22 for a schedule update.

With respect to the expected and optimistic schedules, the scheduler module 22 assigns earlier start and completion times to the remaining service calls on the schedule if the preceding call is completed ahead of its scheduled completion time. If either the actual completion time of the preceding call is later than its scheduled completion time, or the actual running duration of an active call extends beyond the scheduled completion time, the scheduler module 22 assigns later start and completion times to the remaining calls. Thus, the scheduler module 22 updates the schedule to reflect the actual situation in the field by moving calls forward or pushing them back on the schedules. The new start and completion times assigned to the calls on the expected and optimistic schedules essentially represent the difference between the scheduled completion times of the preceding calls and the actual completion times.

The scheduler module 22 modifies the pessimistic schedule differently. The scheduler module 22 assigns the pessimistic start time for a later call by adding an estimated travel time to the pessimistic completion time of the immediately preceding call. However, as a service call is completed by a technician, or as the duration of an active service call progresses, the scheduler module 22 recalculates the aggregate duration for the remaining calls to reduce the variation in the remaining schedule. Because a completed call has a known, fixed duration, any variation in the overall schedule due to that particular call is eliminated. Similarly, the running duration of an active call effectively provides a minimum actual duration for the call upon completion. Thus, the combined probability distributions for the remaining calls in the sequence can be recalculated to generate earlier or later start and completion times, as dictated by the actual durations of the preceding completed calls and the actual running durations of the active preceding calls.

Figure 12:
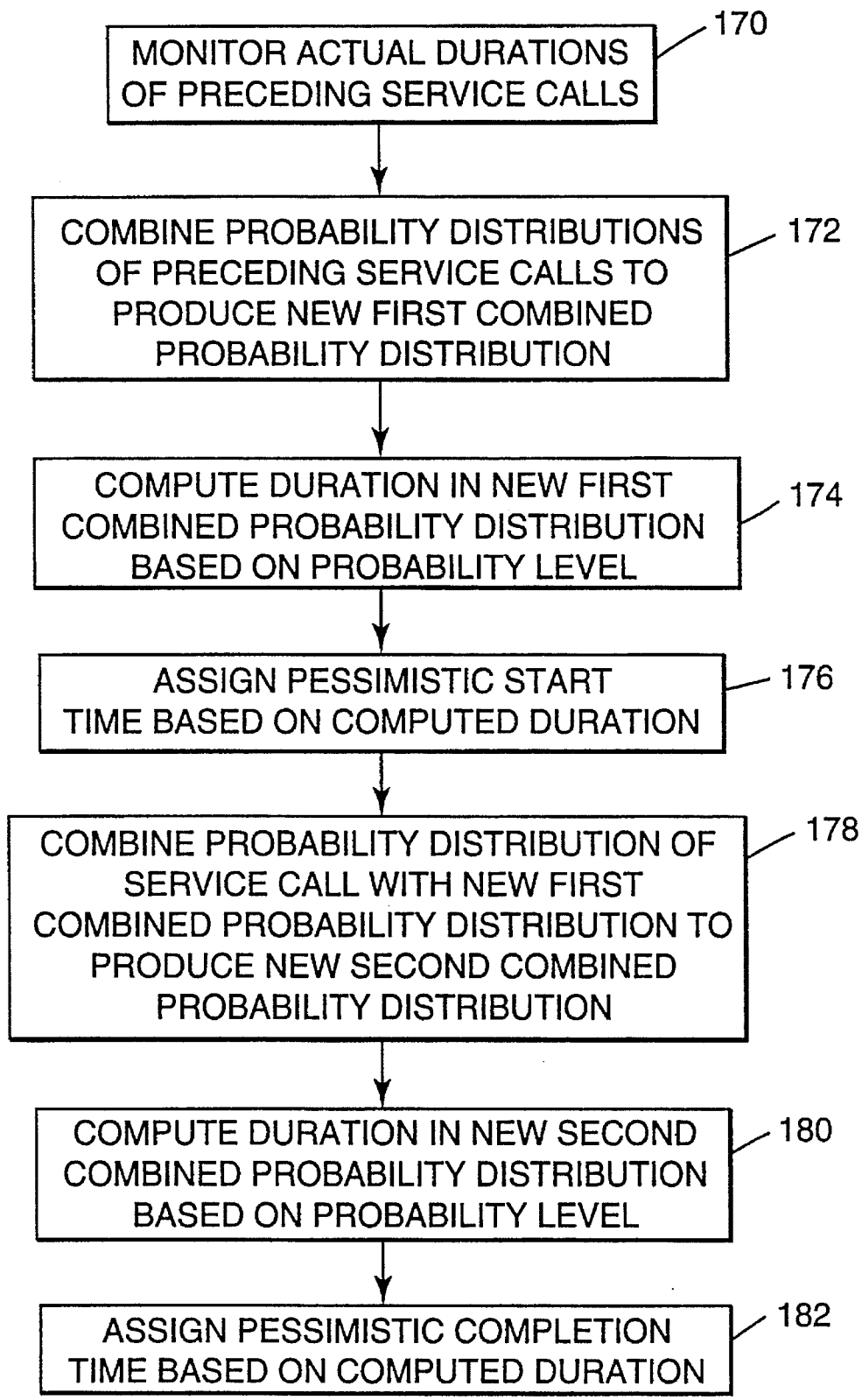
FIG. 12 is a flow diagram illustrating the recalculation of a combined probability distribution in response to the actual duration of a completed resource request or the actual running duration of an active resource request, in accordance with the present invention.

The operation of the scheduler module 22 in recalculating the aggregate duration up to each of the uncompleted service calls is illustrated in FIG. 12. As indicated by block 170, the scheduler module 22 is able to monitor the actual durations of service calls by communication with the assigner module 20. After determining the actual duration of a completed call or the actual running duration of an active call based on the time-stamp information passed by the assigner module 20, the scheduler module 22 generates a combined probability distribution for each of the remaining service calls in the sequence that is neither completed nor active. As indicated by block 172, the first new combined probability distribution for a service call combines the probability distributions matched with each of the preceding calls in the sequence that are not completed and not active.

The scheduler module 22 computes a duration in the new first combined probability distribution for the respective service call based on the pessimistic probability level, as indicated by block 174 of FIG. 12. With the actual duration of a preceding completed call known, the scheduler module 22 assigns the pessimistic completion time for a later call relative to the point on the schedule corresponding to the known completion time of the preceding call. Similarly, with the running duration of a preceding active call known, the scheduler module 22 assigns the pessimistic completion time for a later call relative to the point on the schedule corresponding to the minimum possible completion time of the preceding call, as indicated by the running duration. The pessimistic completion time for a call therefore can be assigned by adding the aggregate computed duration, plus travel times, to this known point on the schedule. The scheduler module 22 assigns a pessimistic start time for the next call by adding the estimated travel time to the pessimistic completion time of the preceding call. Thus, as indicated by block 176, the pessimistic start time for the next call is based on the computed duration in the new first probability distribution, plus intervening travel times, relative to the known point on the schedule.

To determine the pessimistic completion time for the next call, scheduler module 22 combines the probability distribution for the next call with the new first combined probability distribution generated for the immediately preceding call to produce a new second combined probability distribution, as indicated by block 178. The scheduler module 22 then computes a duration in the new second probability distribution based on the probability level, as indicated by block 180, and assigns a pessimistic completion time to the next call based on the computed duration and the intervening travel times, as indicated by block 182. The computed duration represents the aggregate duration of the uncompleted, nonactive preceding service calls and the next call. Consequently, scheduler module 22 also assigns the pessimistic completion time relative to the known point on the schedule, with travel times included.

As best represented by the scheduler window 30 shown in FIG. 2, the schedule of service calls assigned to a service technician is not continuous, but instead is divided into a plurality of discrete time segments. In FIG. 2, the time segments correspond to the length of an entire work day. For example, the schedule field 34 includes a time segment corresponding to the work day of Monday, May 17, and a following time segment corresponding to the work day of Tuesday, May 18. If a time segment is large enough to accommodate both the expected and pessimistic durations of a service call, the system user can confidently make time commitments that fall within the segment boundaries. When the pessimistic completion time for a service call extends beyond an end of one of the time segments, however, it may be desirable to distribute the call so that the service technician does not run into overtime.

Figure 13:
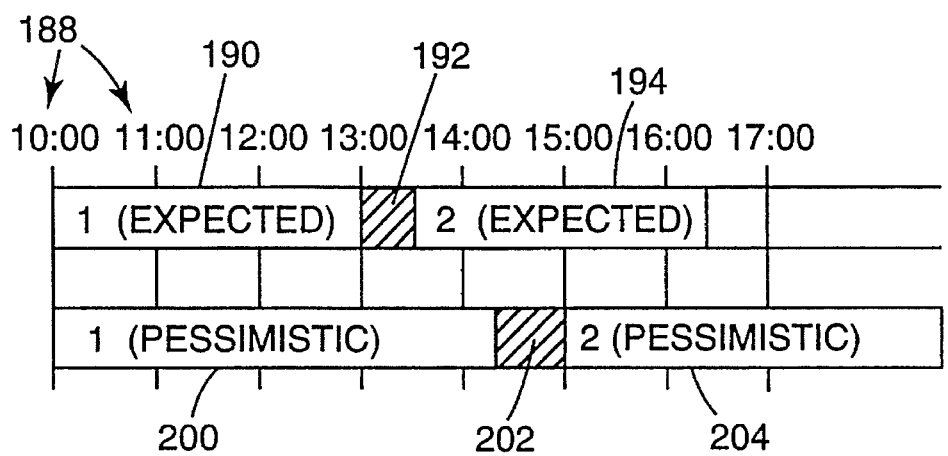
FIG. 13 is an example of a schedule having a resource request with a duration extending beyond a scheduling boundary.

The situation in which the pessimistic duration of a service call extends beyond a segment boundary is illustrated in FIG. 13. The expected schedule shown in FIG. 13 includes a time segment 188 having a first call with an expected duration represented by call block 190, and a second call with an expected duration represented by call block 194. The pessimistic schedule similarly includes the first call with a pessimistic duration represented by call block 200, and the second call with a pessimistic duration represented by call block 204. Blocks 192 and 202 represent the travel times between the first and second calls. The expected completion of the second call, as represented by call block 194, runs to approximately 16:30 of the time segment 188, with 17:00 representing the end of the segment, as well as the end of the work day. However, the pessimistic completion time of the second call, as represented by call block 204, runs well beyond the end of time segment 188.

Figure 14:
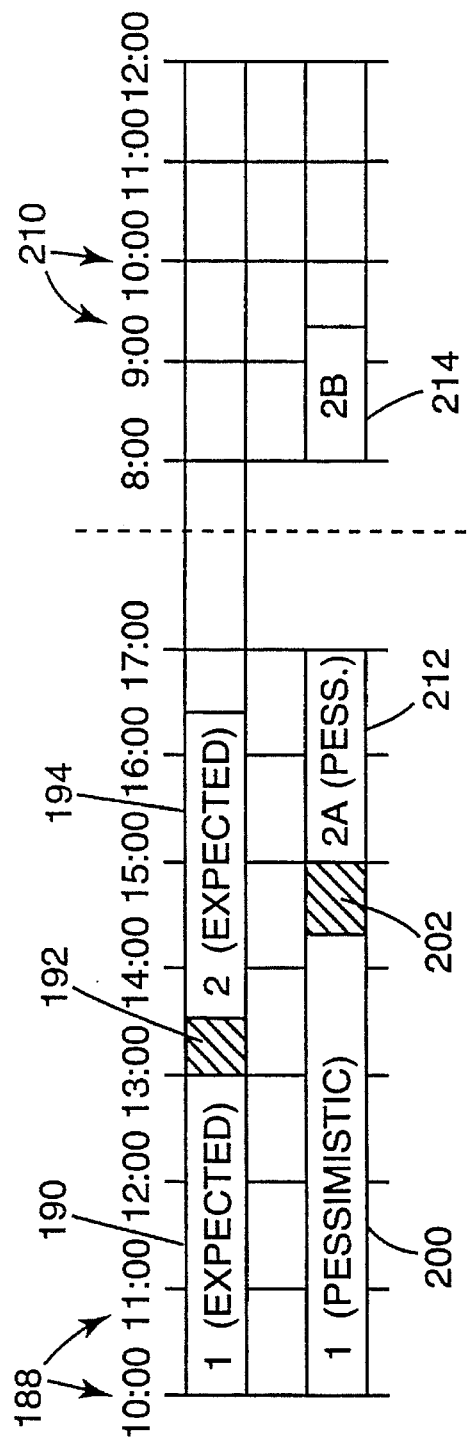
FIG. 14 is an example of a technique for modifying the schedule shown in FIG. 13 to accommodate the portion of the resource request extending beyond the scheduling boundary, in accordance with the present invention.
Figure 15:
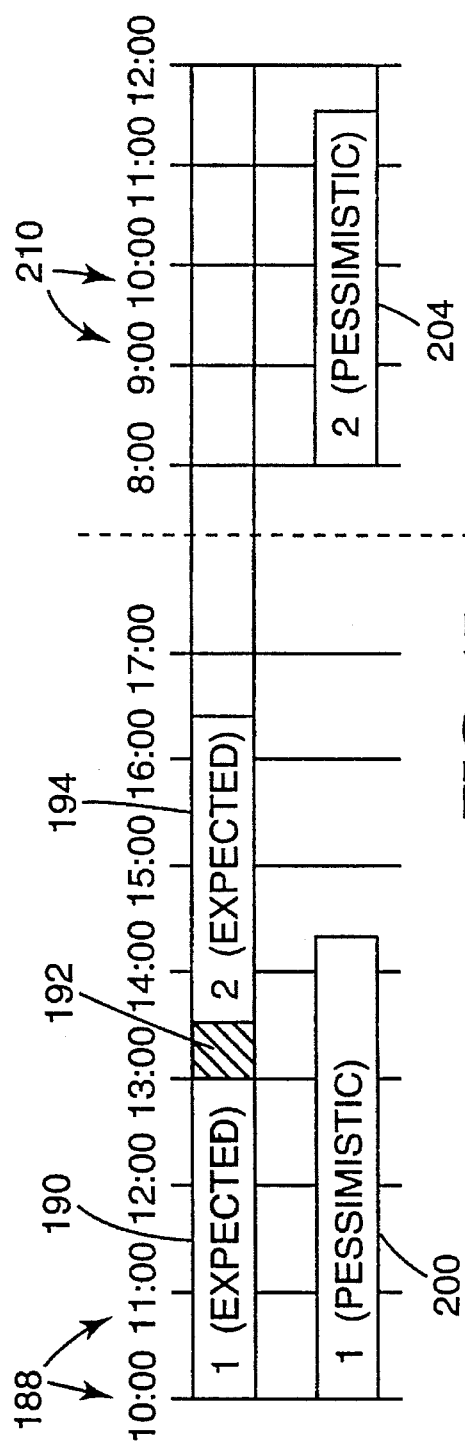
FIG. 15 is an example of a second technique for modifying the schedule shown in FIG. 13 to accommodate the portion of the resource request extending beyond the scheduling boundary, in accordance with the present invention.

When the pessimistic completion time of a service call runs beyond the end of a time segment, the scheduler module 22 effectively overrides the previously assigned pessimistic completion time. The scheduler module 22 distributes the service call in one of two ways, depending on the policy of the particular system user or service organization. First, as shown in FIG. 14, the scheduler module may divide the call duration into a first component 212 and a second component 214. The first component 212 fits within the time segment 188, and the second component 214 does not. Thus, the scheduler module 22 simply maintains the original pessimistic start time for the first component 212, and assigns a new pessimistic start time to the second component 214 at the beginning of the next time segment 210. Although this first technique achieves an efficient use of time, many field service technicians disfavor splitting an activity across a segment boundary. In other words, technicians generally prefer to finish the entire job in one visit, if possible. Therefore, the scheduler module 22 alternatively may assign a new pessimistic start time to the entire service call at the beginning of the next time segment 210, as shown in FIG. 15. This second technique has the effect of moving the entire call block 204 to the next work day.

Having described the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A computer-implemented method for scheduling a plurality of resource requests for a resource provider, wherein each of said resource requests has an uncertain duration, and each of said resource requests is associated with one of a plurality of different types of activities, said method comprising the steps of:

matching each of said resource requests with one of a plurality of probability distributions for a potential duration of the respective resource request based on the type of activity associated with said respective resource request;

generating a sequence of said resource requests;

generating, for each of said resource requests, a first combined probability distribution, said first combined probability distribution combining the probability distributions matched with each of the preceding resource requests in said sequence;

selecting a probability level;

computing, for each of said resource requests, a first duration in the first combined probability distribution for the respective resource request based on said probability level;

generating a first schedule of said resource requests by assigning a start time to each of said resource requests following said first one of said resource requests in said sequence based on the first duration in said first combined probability distribution computed for the respective resource request based on said probability level;

determining second durations for said resource requests, wherein the second durations are different than the first durations; and generating a second schedule of said resource requests by assigning a second start time to each of said resource requests following said first one of said resource requests in said sequence based on a sum of the second durations determined for the preceding resource requests in said sequence.

2. The method of claim 1, wherein said matching step includes matching each of said resource requests with one of said plurality of probability distributions based on the type of activity associated with said respective resource request and further based on an identity of said resource provider.

3. The method of claim 2, wherein each of said resource requests is a field service call and said resource provider is a field service technician.

4. The method of claim 1, wherein each of said resource requests is a field service call and said resource provider is a field service technician.

5. The method of claim 1, further comprising the steps of:

generating, for each of said resource requests, a second combined probability distribution, said second combined probability distribution combining the probability distribution matched with the respective resource request and the probability distributions matched with each of the preceding resource requests in said sequence; and computing a duration in the second combined probability distribution for the respective resource request based on said probability level, wherein said step of generating said first schedule includes assigning a completion time to each of said resource requests following said first one of said resource requests in said sequence based on the duration in said second combined probability distribution computed for the respective resource request based on said probability level.

6. The method of claim 5, wherein each of said resource requests is a field service call and said resource provider is a field service technician.

7. The method of claim 1, further comprising the steps of:

monitoring actual durations of each of said preceding resource requests completed by said resource provider;

monitoring actual running durations of said preceding resource requests actively served by said resource provider;

generating, for each of said resource requests not completed and not actively served by said resource provider, a new first combined probability distribution, said new first combined probability distribution combining the probability distributions matched with each of the preceding resource requests in said sequence not completed and not actively served by said resource provider;

computing, for each of said resource requests not completed and not actively served by said resource provider, a duration in the new first combined probability distribution for the respective resource request based on said probability level; and modifying said first schedule by assigning a start time to each of said resource requests not completed and not actively served by said resource provider based on the duration in said new first combined probability distribution computed for the respective resource request based on said probability level.

8. The method of claim 7, wherein each of said resource requests is a field service call and said resource provider is a field service technician.

9. The method of claim 1, said method further comprising the steps of:

selecting a second probability level;

computing, for each of said resource requests, one of the second durations as a duration in the probability distribution matched with the respective resource request based on said second probability level; and generating the second schedule of said resource requests by assigning a start time to each of said resource requests following a first one of said resource requests in said sequence based on a sum of the second durations computed for the preceding resource requests in said sequence.

10. The method of claim 9, wherein each of said resource requests is a field service call and said resource provider is a field service technician.

11. The method of claim 1, further comprising the steps of:

determining, for each of said resource requests, one of the second durations as a mean duration in the probability distribution matched with the respective resource request; and generating the second schedule of said resource requests by assigning a start time to each of said resource requests following a first one of said resource requests in said sequence based on a sum of the mean durations determined for the preceding resource requests in said sequence.

12. The method of claim 11, wherein each of said resource requests is a field service call and said resource provider is a field service technician.

13. A system for scheduling a plurality of resource requests for a resource provider, wherein each of said resource requests has an uncertain duration, and each of said resource requests is associated with one of a plurality of different types of activities, said system comprising:

means for matching each of said resource requests with one of a plurality of probability distributions for a potential duration of the respective resource request based on the type of activity associated with said respective resource request;

means for generating a sequence of said resource requests;

means for generating, for each of said resource requests, a first combined probability distribution, said first combined probability distribution combining the probability distributions matched with each of the preceding resource requests in said sequence;

means for selecting a probability level; means for computing, for each of said resource requests, a duration in the first combined probability distribution for the respective resource request based on said probability level;

means for generating a first schedule of said resource requests by assigning a start time to each of said resource requests following said first one of said resource requests in said sequence based on the duration in said first combined probability distribution computed for the respective resource request;

means for determining second durations for said resource requests, wherein the second durations are different than the first durations; and means for generating a second schedule of said resource requests by assigning a second start time to each of said resource requests following said first one of said resource requests in said sequence based on a sum of the second durations determined for the preceding resource requests in said sequence.

14. The system of claim 13, wherein said matching means includes means for matching each of said resource requests with one of said plurality of probability distributions based on the type of activity associated with said respective resource request and further based on an identity of said resource provider.

15. The system of claim 14, wherein each of said resource requests is a field service call and said resource provider is a field service technician.

16. The system of claim 13, wherein each of said resource requests is a field service call and said resource provider is a field service technician.

17. The system of claim 13, further comprising:

means for generating, for each of said resource requests, a second combined probability distribution, said second combined probability distribution combining the probability distribution matched with the respective resource request and the probability distributions matched with each of the preceding resource requests in said sequence; and means for computing a duration in the second combined probability distribution for the respective resource request based on said probability level, wherein said means for generating said first schedule includes means for assigning a completion time to each of said resource requests following said first one of said resource requests in said sequence based on the duration in said second combined probability distribution for the respective resource request computed based on said probability level.

18. The system of claim 17, wherein each of said resource requests is a field service call and said resource provider is a field service technician.

19. The system of claim 13, further comprising:

means for monitoring actual durations of each of said preceding resource requests completed by said resource provider and for monitoring actual running durations of each of said preceding resource requests actively served by said resource provider;

means for generating, for each of said resource requests not completed and not actively served by said resource provider, a new first combined probability distribution, said new first combined probability distribution combining the probability distributions matched with each of the preceding resource requests in said sequence not completed and not actively served by said resource provider;

means for computing, for each of said resource requests not completed and not actively served by said resource provider, a duration in the new first combined probability distribution for the respective resource request based on said probability level; and means for modifying said first schedule by assigning a start time to each of said resource requests not completed and not actively served by said resource provider based on the duration in said new first combined probability distribution for the respective resource request computed based on said probability level.

20. The system of claim 19, wherein each of said resource requests is a field service call and said resource provider is a field service technician.

21. The system of claim 13, further comprising:

means for selecting a second probability level;

means for computing, for each of said resource requests, one of the second durations as a duration in the probability distribution matched with the respective resource request based on said second probability level; and means for generating the second schedule of said resource requests by assigning a start time to each of said resource requests following a first one of said resource requests in said sequence based on a sum of the second durations computed for the preceding resource requests in said sequence.

22. The system of claim 21, wherein each of said resource requests is a field service call and said resource provider is a field service technician.

23. The system of claim 13, further comprising:

means for determining, for each of said resource requests, one of the second durations as a mean duration in the probability distribution matched with the respective resource request; and means for generating the second schedule of said resource requests by assigning a start time to each of said resource requests following a first one of said resource requests in said sequence based on a sum of the mean durations determined for the preceding resource requests in said sequence.

24. The system of claim 23, wherein each of said resource requests is a field service call and said resource provider is a field service technician.

25. A computer-implemented method for scheduling a plurality of resource requests for a resource provider, wherein each of said resource requests has an uncertain duration, and each of said resource requests is associated with one of a plurality of different types of activities, said method comprising the steps of:

matching each of said resource requests with one of a plurality of probability distributions for a potential duration of the respective resource request based on the type of activity associated with said respective resource request;

generating a sequence of said resource requests;

generating, for each of said resource requests, a first combined probability distribution, said first combined probability distribution combining the probability distributions matched with each of the preceding resource requests in said sequence;

selecting a first probability level;

selecting a second probability level, wherein the second probability level is different than the first probability level;

computing, for each of said resource requests, a first duration in the first combined probability distribution for the respective resource request based on said first probability level;

computing, for each of said resource requests, a second duration in the first combined probability distribution for the respective resource request based on said second probability level;

generating a first schedule of said resource requests by assigning a start time to each of said resource requests following said first one of said resource requests in said sequence based on the first duration in said first combined probability distribution computed for the respective resource request based on said first probability level; and generating a second schedule of said resource requests by assigning a start time to each of said resource requests following said first one of said resource requests in said sequence based on the second duration in said first combined probability distribution computed for the respective resource request based on said second probability level.

26. The method of claim 25, further comprising the steps of:

generating, for each of said resource requests, a second combined probability distribution, said second combined probability distribution combining the probability distribution matched with the respective resource request and the probability distributions matched with each of the preceding resource requests in said sequence;

computing a duration in the second combined probability distribution for the respective resource request based on said first probability level, and computing a duration in the second combined probability distribution for the respective resource request based on said second probability level, wherein said step of generating said first schedule includes assigning a completion time to each of said resource requests following said first one of said resource requests in said sequence based on the duration in said second combined probability distribution computed for the respective resource request based on said first probability level, and wherein said step of generating said second schedule includes assigning a completion time to each of said resource requests following said first one of said resource requests in said sequence based on the duration in said second combined probability distribution computed for the respective resource request based on said second probability level.

27. The method of claim 25, further comprising the steps of:

monitoring actual durations of each of said preceding resource requests completed by said resource provider;

monitoring actual running durations of said preceding resource requests actively served by said resource provider;

generating, for each of said resource requests not completed and not actively served by said resource provider, a new first combined probability distribution, said new first combined probability distribution combining the probability distributions matched with each of the preceding resource requests in said sequence not completed and not actively served by said resource provider;

computing, for each of said resource requests not completed and not actively served by said resource provider, a first duration in the new first combined probability distribution for the respective resource request based on said first probability level;

computing, for each of said resource requests not completed and not actively served by said resource provider, a second duration in the new first combined probability distribution for the respective resource request based on said second probability level;

modifying said first schedule by assigning a start time to each of said resource requests not completed and not actively served by said resource provider based on the first duration in said new first combined probability distribution computed for the respective resource request based on said first probability level; and modifying said second schedule by assigning a start time to each of said resource requests not completed and not actively served by said resource provider based on the second duration in said new first combined probability distribution computed for the respective resource request based on said second probability level.

28. The method of claim 25, wherein each of said resource requests is a field service call and said resource provider is a field service technician.

29. A computer-implemented system for scheduling a plurality of resource requests for a resource provider, wherein each of said resource requests has an uncertain duration, and each of said resource requests is associated with one of a plurality of different types of activities, said system comprising:

means for matching each of said resource requests with one of a plurality of probability distributions for a potential duration of the respective resource request based on the type of activity associated with said respective resource request;

means for generating a sequence of said resource requests;

means for generating, for each of said resource requests, a first combined probability distribution, said first combined probability distribution combining the probability distributions matched with each of the preceding resource requests in said sequence;

means for selecting a first probability level;

means for selecting a second probability level, wherein the second probability level is different than the first probability level;

means for computing, for each of said resource requests, a first duration in the first combined probability distribution for the respective resource request based on said first probability level;

means for computing, for each of said resource requests, a second duration in the first combined probability distribution for the respective resource request based on said second probability level;

means for generating a first schedule of said resource requests by assigning a start time to each of said resource requests following said first one of said resource requests in said sequence based on the first duration in said first combined probability distribution computed for the respective resource request based on said first probability level; and means for generating a second schedule of said resource requests by assigning a start time to each of said resource requests following said first one of said resource requests in said sequence based on the second duration in said first combined probability distribution computed for the respective resource request based on said second probability level.

30. The system of claim 29, further comprising:

means for generating, for each of said resource requests, a second combined probability distribution, said second combined probability distribution combining the probability distribution matched with the respective resource request and the probability distributions matched with each of the preceding resource requests in said sequence;

means for computing a duration in the second combined probability distribution for the respective resource request based on said first probability level, and means for computing a duration in the second combined probability distribution for the respective resource request based on said second probability level, wherein said means for generating said first schedule includes means for assigning a completion time to each of said resource requests following said first one of said resource requests in said sequence based on the duration in said second combined probability distribution computed for the respective resource request based on said first probability level, and wherein said means for generating said second schedule includes means for assigning a completion time to each of said resource requests following said first one of said resource requests in said sequence based on the duration in said second combined probability distribution computed for the respective resource request based on said second probability level.

31. The system of claim 29, further comprising:

means for monitoring actual durations of each of said preceding resource requests completed by said resource provider;

means for monitoring actual running durations of said preceding resource requests actively served by said resource provider;

means for generating, for each of said resource requests not completed and not actively served by said resource provider, a new first combined probability distribution, said new first combined probability distribution combining the probability distributions matched with each of the preceding resource requests in said sequence not completed and not actively served by said resource provider;

means for computing, for each of said resource requests not completed and not actively served by said resource provider, a first duration in the new first combined probability distribution for the respective resource request based on said first probability level;

means for computing, for each of said resource requests not completed and not actively served by said resource provider, a second duration in the new first combined probability distribution for the respective resource request based on said second probability level;

means for modifying said first schedule by assigning a start time to each of said resource requests not completed and not actively served by said resource provider based on the first duration in said new first combined probability distribution computed for the respective resource request based on said first probability level; and means for modifying said second schedule by assigning a start time to each of said resource requests not completed and not actively served by said resource provider based on the second duration in said new first combined probability distribution computed for the respective resource request based on said second probability level.

32. The system of claim 29, wherein each of said resource requests is a field service call and said resource provider is a field service technician.

* * * * *